(12) United States Patent
Link

(10) Patent No.: US 8,795,090 B2
(45) Date of Patent: Aug. 5, 2014

(54) HAND-HELD VIDEO GAME PLATFORM EMULATION

(75) Inventor: Patrick J. Link, Carnation, WA (US)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/439,770

(22) Filed: Apr. 4, 2012

(65) Prior Publication Data

US 2013/0095922 A1    Apr. 18, 2013

Related U.S. Application Data

(60) Continuation of application No. 10/690,818, filed on Oct. 23, 2003, now Pat. No. 8,157,654, which is a division of application No. 09/723,322, filed on Nov. 28, 2000, now Pat. No. 6,672,963.

(60) Provisional application No. 60/233,622, filed on Sep. 18, 2000.

(51) Int. Cl.
*A63F 9/24* (2006.01)
(52) U.S. Cl.
USPC ...................... 463/43; 463/1; 463/44; 463/45
(58) Field of Classification Search
USPC ................................ 463/1, 43–45; 703/23, 26
See application file for complete search history.

(56) References Cited

U.S. PATENT DOCUMENTS

| | | | |
|---|---|---|---|
| 4,481,529 A | 11/1984 | Kerling | |
| 4,516,777 A | 5/1985 | Nikora | |
| 4,542,903 A | 9/1985 | Yokoi et al. | |
| 4,628,304 A | 12/1986 | Bottiau | |
| 4,756,528 A | 7/1988 | Umashankar | |
| 4,771,279 A | 9/1988 | Hannah | |
| 4,858,930 A | 8/1989 | Sato | |
| 4,903,218 A | 2/1990 | Longo et al. | |
| 4,922,420 A | 5/1990 | Nakagawa et al. | |
| 4,924,413 A | 5/1990 | Suwannukul | |

(Continued)

FOREIGN PATENT DOCUMENTS

| | | |
|---|---|---|
| EP | 0 960 637 | 7/2000 |
| JP | 63-242293 | 10/1988 |

(Continued)

OTHER PUBLICATIONS

Readme.txt "Gameboy 98" v0.05c [online]. Jan. 9, 1999 [retrieved on Jun. 26, 2013]. Retrieved from the internet: <URL:http://www.zophar.net/gb/gameboy98.html>.*

(Continued)

*Primary Examiner* — Dmitry Suhol
*Assistant Examiner* — David Duffy
(74) *Attorney, Agent, or Firm* — Nixon & Vanderhye, P.C.

(57) ABSTRACT

A software emulator for emulating a handheld video game platform such as GAME BOY®, GAME BOY COLOR® and/or GAME BOY ADVANCE® on a low-capability target platform (e.g., a seat-back display for airline or train use, a personal digital assistant, a cell phone) uses a number of features and optimizations to provide high quality graphics and sound that nearly duplicates the game playing experience on the native platform. Some exemplary features include use of bit BLITing, graphics character reformatting, modeling of a native platform liquid crystal display controller using a sequential state machine, and selective skipping of frame display updates if the game play falls behind what would occur on the native platform.

14 Claims, 33 Drawing Sheets

EXAMPLE VIRTUAL LCD CONTROLLER STATE MACHINE

(56) References Cited

U.S. PATENT DOCUMENTS

| | | | |
|---|---|---|---|
| 4,931,860 A | 6/1990 | Narumiya | |
| 4,979,738 A | 12/1990 | Frederiksen | |
| 5,095,798 A | 3/1992 | Okada et al. | |
| 5,134,391 A | 7/1992 | Okada | |
| 5,153,577 A | 10/1992 | Mackey et al. | |
| 5,184,830 A | 2/1993 | Okada et al. | |
| 5,265,888 A | 11/1993 | Yamamoto et al. | |
| 5,282,621 A | 2/1994 | Tseng | |
| 5,300,944 A | 4/1994 | Shapiro et al. | |
| 5,395,112 A | 3/1995 | Darling | |
| 5,400,053 A | 3/1995 | Johary et al. | |
| 5,412,800 A | 5/1995 | Bril et al. | |
| 5,442,375 A | 8/1995 | Wojaczynski et al. | |
| 5,448,263 A | 9/1995 | Martin | |
| 5,552,799 A | 9/1996 | Hashiguchi | |
| 5,556,108 A | 9/1996 | Nagano et al. | |
| 5,559,954 A | 9/1996 | Sakoda et al. | |
| RE35,520 E | 5/1997 | Darling et al. | |
| 5,759,104 A | 6/1998 | Shirae et al. | |
| 5,768,593 A | 6/1998 | Walters et al. | |
| 5,781,758 A * | 7/1998 | Morley | 703/23 |
| 5,785,598 A | 7/1998 | Hsu | |
| 5,790,096 A | 8/1998 | Hill, Jr. | |
| 5,790,825 A | 8/1998 | Traut | |
| 5,793,351 A | 8/1998 | Leach | |
| 5,819,063 A | 10/1998 | Dahl et al. | |
| 5,844,532 A | 12/1998 | Silverbrook et al. | |
| 5,854,620 A | 12/1998 | Mills et al. | |
| 5,892,939 A | 4/1999 | Call et al. | |
| 5,903,760 A | 5/1999 | Farber et al. | |
| 5,949,985 A * | 9/1999 | Dahl et al. | 703/26 |
| 5,959,596 A | 9/1999 | McCarten et al. | |
| 6,007,428 A | 12/1999 | Nishiumi et al. | |
| 6,020,751 A | 2/2000 | Rampone et al. | |
| 6,047,373 A | 4/2000 | Hall et al. | |
| 6,058,288 A | 5/2000 | Reed et al. | |
| 6,084,600 A | 7/2000 | Munshi | |
| 6,115,054 A | 9/2000 | Giles | |
| 6,132,315 A | 10/2000 | Miyamoto et al. | |
| 6,167,365 A * | 12/2000 | Karthikeyan et al. | 703/28 |
| 6,192,446 B1 | 2/2001 | Mullarkey et al. | |
| 6,247,172 B1 * | 6/2001 | Dunn et al. | 717/141 |
| 6,315,669 B1 | 11/2001 | Okada et al. | |
| 6,390,920 B1 | 5/2002 | Infiesto et al. | |
| 6,409,602 B1 | 6/2002 | Wiltshire et al. | |
| 6,651,132 B1 | 11/2003 | Traut | |
| 6,658,056 B1 | 12/2003 | Duruoz et al. | |
| 7,069,205 B1 | 6/2006 | Carroll et al. | |
| 7,506,265 B1 | 3/2009 | Traut et al. | |
| 2003/0207712 A1 | 11/2003 | Sterchi et al. | |

FOREIGN PATENT DOCUMENTS

| | | |
|---|---|---|
| JP | 4-49989 | 2/1992 |
| JP | 4-140791 | 5/1992 |
| JP | 4-140792 | 5/1992 |
| JP | 04261589 A | 9/1992 |
| JP | 7-204349 | 8/1995 |
| JP | 10-137447 | 5/1998 |
| JP | 10-328408 | 12/1998 |
| JP | 11-207034 | 8/1999 |
| JP | 11-333144 | 12/1999 |
| WO | WO0039693 | 7/2000 |
| WO | WO 02/06941 A2 | 1/2002 |
| WO | WO 02/06947 A2 | 1/2002 |
| WO | WO 02/08905 A2 | 1/2002 |
| WO | WO 02/08905 A3 | 1/2002 |

OTHER PUBLICATIONS

Shih, Ming-yu, Readmee.txt, "SMYGB—Game Boy Emulator v0.20," (smy@ip.csie.ncu.edu.tw), HTTP://www.billyjr.com/smygb (Jan. 2, 1999).
"Snarkotagen's Emulation, The Latest Emulator News," HTTP://home.swipnet.se/snarkofagen/, (Nov. 15, 1999-Dec. 29, 1999).
"NO$GMB—version 2.5, nocash gameboy emulator/debugger for dos/windows" HTTP://www.work.de/nocash/gmb.htm.
"Welcome to my Vgb page," HTTP://elektron.et.tudelft.nl/~jdegoed/vgb.html.
Bleem!™, Play hundreds of Playstation Games on Your PC bleem! technotes: graphics, "SUPPORT/PC/TECHNOTES," web site information, www.bleem.com, 20 pages (2001).
CD containing the following files Donkey1.zip file S9x_windows_119a36_i386.zip smygb02.zip yoshi.GB Directory listing of the files on CD.
Printout of windows.txt file, "Snes9X: The Portable Super Nintendo Entertainment Sysyem Emulator," v1.19 (Jun. 5, 1999).
Printout of Readme.txt, "Snes9X: The Portable Super Nintendo Entertainment System Emulator," v1.19 (Jun. 5, 1999).
Printout of Readmee.txt, "SMYGB—Game Boy Emulator v0.20," by Ming-yu Shih (Jan. 2, 1999).
"Professional Power," *Sinclair Research promotional brochure* (1982), found at http://www.nvg.ntnu.no/sinclair/computers/zxspectrum/professional_power.htm.
"ZX Spectrum Technical Data," *Sinclair Research* leaflet (1982), found at http://www.ngv.ntnu.no/sinclair/computers/zxspectrum/spec_technical.htm.
MAME: The Official Multiple Arcade Machine Emulator Site, circa 1997, http://www.mame.net.
MAME: Readme: circa 1997, http://www.mame.net/readme.html.
MAME: FAQs: circa 1997, http://www.mame.net/mamefaq.html.
NO$GMB FAQs: circa 1997, published with program downloaded from http://www.work.de/nocash/gmb.htm.
Multiple Arcade Machine Emulator (MAME) Documentation, 1997-1999.
Computer Closet Collection, NEC Turbo Express, printed from wysiwyg://22/http://www.geocities.com/~compcloset/NECTurboExpress.htm on Sep. 28, 2000 (2 pages), copyright 1997-1999, last modified Jun. 24, 1999.
NEC Turbo Express, printed from http://www.edu.uni-klu.ac.at/~kseiner/express.html on Sep. 28, 2000 (2 pages), document date unknown.
Turbo Express FAQ, printed from http://www.gameconsoles.com/turboexp_faq.htm on Sep. 28, 2000 (18 pages), last revision on document: May 25, 1995.
Computer Closet Collection, Sega Game Gear, printed from wysiwyg://28/http://www.geocities.com/~compcloset/SegaGameGear.htm on Sep. 28, 2000 (2 pages), copyright 1997-1999, last modified Jun. 22, 1999.
The Real Game Gear FAQ, Version GG.04, Dec. 1999, printed from http://www.classicgaming.com/museum/realggfaq.txt on Sep. 28, 2000 (32 pages).
Computer Closet Collection, Atari Lynx, printed from wysiwyg://12/http://www.geocities.com~compcloset/Atarilynx.htm on Sep. 28, 2000 (2 pages), copyright 1997-1999, last modified Jun. 22, 1999.
[FAQ] Atari Lynx Frequently-Asked Questions, printed from http://www.landfield.com/faqs/games/video-games/atari/lynx on Sep. 28, 2000 (16 pages), last revision of document: May 1, 2000.
Computer Closet Collection, Nintendo Game Boy/Game Boy Light, printed from wysiwyg://40/http://www.geocities.com/~compcloset/NintendoGameBoy.htm on Sep. 28, 2000 (5 pages), copyright 1997-1999, last modified Jun. 22, 1999.
Computer Closet Collection, Milton-Bradley Microvision, printed from wysiwyg://52/http://www.geocities.com/~compcloset/MiltonBradley-Microvision.htm on Sep. 28, 2000 (2 pages), copyright 1997-1999, last modified Jun. 22, 1999.
Microvision FAQ Version 0.08, copyright 1994, 1995, printed from http://www.gameconsoles.com/microvision_faq.htm on Sep. 28, 2000 (13 pages).
Computer Closet Collection, Sega Nomad, printed from wysiwyg://34/http://www.geocities.com/~compcloset/SegaNomad.htm on Sep. 28, 2000 (2 pages), copyright 1997-1999, last modified Jun. 22, 1999.
Sega Nomad Press Announcement of Aug. 22, 1995, printed from http://gamezero.com/team-0/whats_new/past/nomad.html on Sep. 28, 2000 (2 pages).

(56) References Cited

OTHER PUBLICATIONS

Computer Closet Collection, Tiger Game.com, printed wysiwyg://46/http://www.geocities.com/~compcloset/TigerGameCom.htm on Sep. 28, 2000 (1 page), copyright 1997-1999, last modified Jun. 22, 1999.
Tiger Game.Com, "Low Cost, Big Games", printed from http://gamecenter.com/Consoles/Features/Pocket/ss02.html on Sep. 28, 2000 (2 pages), document date unknown.
Charest, "Z80 Emulator" (Microprofuction), 2000.
Fayzeillin, Documents Relating to Emulators in General and the Z.80 Processor, 1997-2000.
Lanter Z80 v4.00 Emulator Documentation, 1999.
Readme vba v0.4.txt, "Welcome to VisualBoyAdvance version 0.4" (Sep. 16, 2001).
Copyright, Txt, homepage: http://yboy.emuhq.com (2001).
VisualBoyAdvance Homepage, http://vba.ngemu.com/, Screen shots, Downloads, FAQ, Links, Support Us (2002-2004).
Zophar's Domain: GameBoy Emulators, http://www.zophar.net/gb.html (12 pages).
Zophar's Domain: GameBoy Advance Emulators, http://www.zophar.net/gb.html (4 pages).
Visual Boy Advance Quick Start Guide (2003).
Visual Boy Advance Software (copyright 2001-2002 by forgotten).
PalmBoy by Bodo Wenzel, PalmBoy v.3.3b, http://palmboy.suburbia.com.au.
News About PalmBoy, http://palmboy.suburbia.com.au/news.htm.
Phoinix by Bodo Wenzel, Phoinix, the free Gameboy emulator for PalmOS, http://phoenix.sourceforge.net/.
Gambit Studio—Liberty Game Boy Emulator, http://www.gamebitstudios.com/Liberty.asp.
Gambit Studios About Us, http://www.gamebitstudios.com/companyinfo.asp.
Gambit Studios What's New, http://www.gambitstudios.com/whatsnew.asp.
Adam Polanski, Jan. 7, 1999, Gameboy 98 Homepage, pp. 1-4.
Z80-68K-v150 Z80 Engine written in 68020 assembler for inclusion in C/C++ projects, written by Gunter Woigk, dated Dec. 25, 1999.
Snes9x: The Portable Super Nintendo Entertainment System Emulator v1.19, Jun. 5, 1999.

* cited by examiner

EXAMPLE EMULATOR ARCHITECTURE

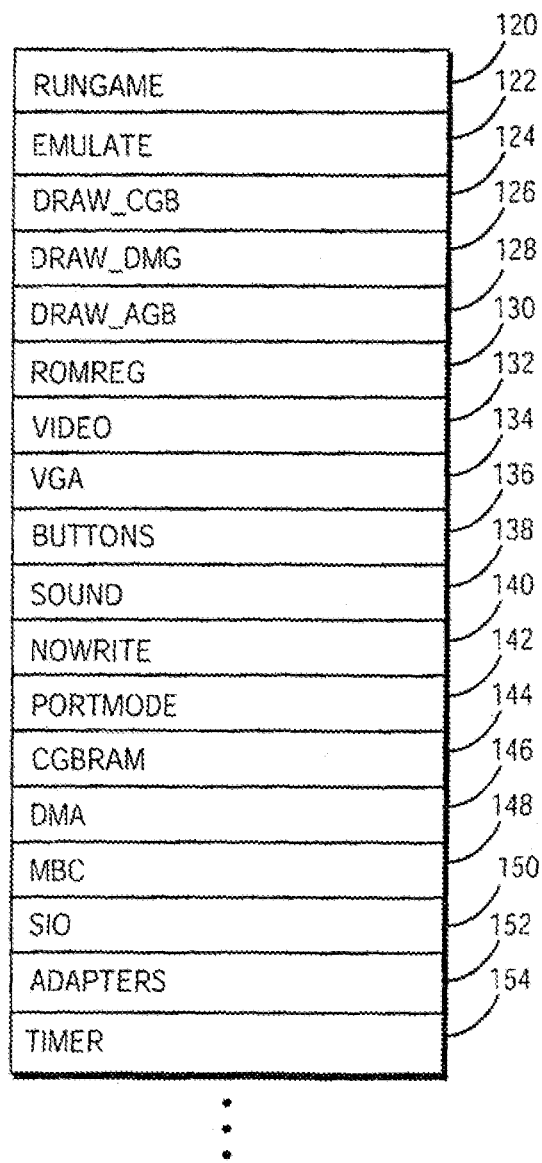
Fig. 3 EXAMPLE FUNCTIONAL MODULES

EXAMPLE MEMORY OBJECTS

EXAMPLE EMULATED CARTRIDGE ROM

*Fig. 6*

Compatibility modes:

| CGB_INCOMPATIBLE |
| --- |
| CGB_COMPATIBLE |
| CGB_EXCLUSIVE |
| AGB |

Registration Data Locations:

| ROMREG_CGB |
| --- |
| ROMREG_CARTRIDGE |
| ROMREG_ROM |
| ROMREG_RAM |

*Fig. 7*

EXAMPLE VIRTUAL LCD CONTROLLER STATE MACHINE

EXAMPLE LCD CONTROLLER EMULATION

EXAMPLE STATE MACHINE REGISTERS

| Cycles per Event | DMG | CGB |
|---|---|---|
| HBLANK | 56 (51) | 112 |
| OAM SEARCH | 26 (21) | 52 |
| OAM TRANSFER | 47 (42) | 94 |
| VBLANK | (HBLANK + OAM + TRANSFER) | (HBLANK + OAM + TRANSFER - 30) |
| FRAME | (VBLANK * 154) | (VBLANK * 154) |

*Fig. 9C*

EXAMPLE STATE MACHINE CYCLE PARAMETERS

EXAMPLE LIQUID CRYSTAL DISPLAY CONTROLLER

EXAMPLE OPCODE JUMP TABLE

EXAMPLE NOP EMULATION

EXAMPLE PAGE TABLE

EXAMPLE MEMORY ACCESS OPERATION

EXAMPLE READ + WRITE TABLES

EXAMPLE HL REGISTER
WRITE OPTIMIZATION

EXAMPLE CONTROLLER EMULATION
(BUTTON STATE)

EXAMPLE VIRTUAL MICROPROCESSOR
DATA STRUCTURES

Fig. 19B

EXAMPLE VIRTUAL MICROPROCESSOR DATA STRUCTURES

| REGISTERS | |
|---|---|
| P1 | 0xFF00 |
| SB | 0xFF01 |
| SC | 0xFF02 |
| DIV | 0xFF04 |
| TIMA | 0xFF05 |
| TMA | 0xFF06 |
| TAC | 0xFF07 |
| IF | 0xFF0F |
| NR10 | 0xFF10 |
| NR11 | 0xFF11 |
| NR12 | 0xFF12 |
| NR13 | 0xFF13 |
| NR14 | 0xFF14 |
| NR21 | 0xFF16 |
| NR22 | 0xFF17 |
| NR23 | 0xFF18 |
| NR24 | 0xFF19 |
| NR30 | 0xFF1A |
| NR31 | 0xFF1B |
| NR32 | 0xFF1C |
| NR33 | 0xFF1D |
| NR34 | 0xFF1E |
| NR41 | 0xFF20 |
| NR42 | 0xFF21 |
| NR43 | 0xFF22 |
| NR44 | 0xFF23 |
| NR50 | 0xFF24 |
| NR51 | 0xFF25 |
| NR52 | 0xFF26 |
| LCDC | 0xFF40 |
| STAT | 0xFF41 |
| SCY | 0xFF42 |
| SCX | 0xFF43 |
| LY | 0xFF44 |
| LYC | 0xFF45 |
| DMA | 0xFF46 |
| BGP | 0xFF47 |
| OBP0 | 0xFF48 |
| OBP1 | 0xFF49 |
| WY | 0xFF4A |
| WX | 0xFF4B |
| KEY1 | 0xFF4D |
| VBK | 0xFF4F |
| HDMA1 | 0xFF51 |
| HDMA2 | 0xFF52 |
| HDMA3 | 0xFF53 |
| HDMA4 | 0xFF54 |
| HDMA5 | 0xFF55 |
| BCPS | 0xFF68 |
| BCPD | 0xFF69 |
| OCPS | 0xFF6A |
| OCPD | 0xFF6B |
| SVBK | 0xFF70 |
| IE | 0xFFFF |

| LCDC_BG | | 0X01 |
|---|---|---|
| LCDC_OBJ | | 0x02 |
| LCDC_OBJSIZE | | 0x04 |
| LCDC_BGCODE | | 0x08 |
| LCDC_BGCHR | | 0x10 |
| LCDC_WINDOW | | 0x20 |
| LCDC_WINCODE | 0x40 | |
| LCDC_CONTROL | 0x80 | |

| STAT_MATCH | | 0X04 |
|---|---|---|
| STAT_INT_HBLANK | 0x08 | |
| STAT_INT_VBLANK | 0x10 | |
| STAT_INT_OAM | 0x20 | |
| STAT_INT_MATCH | 0x40 | |

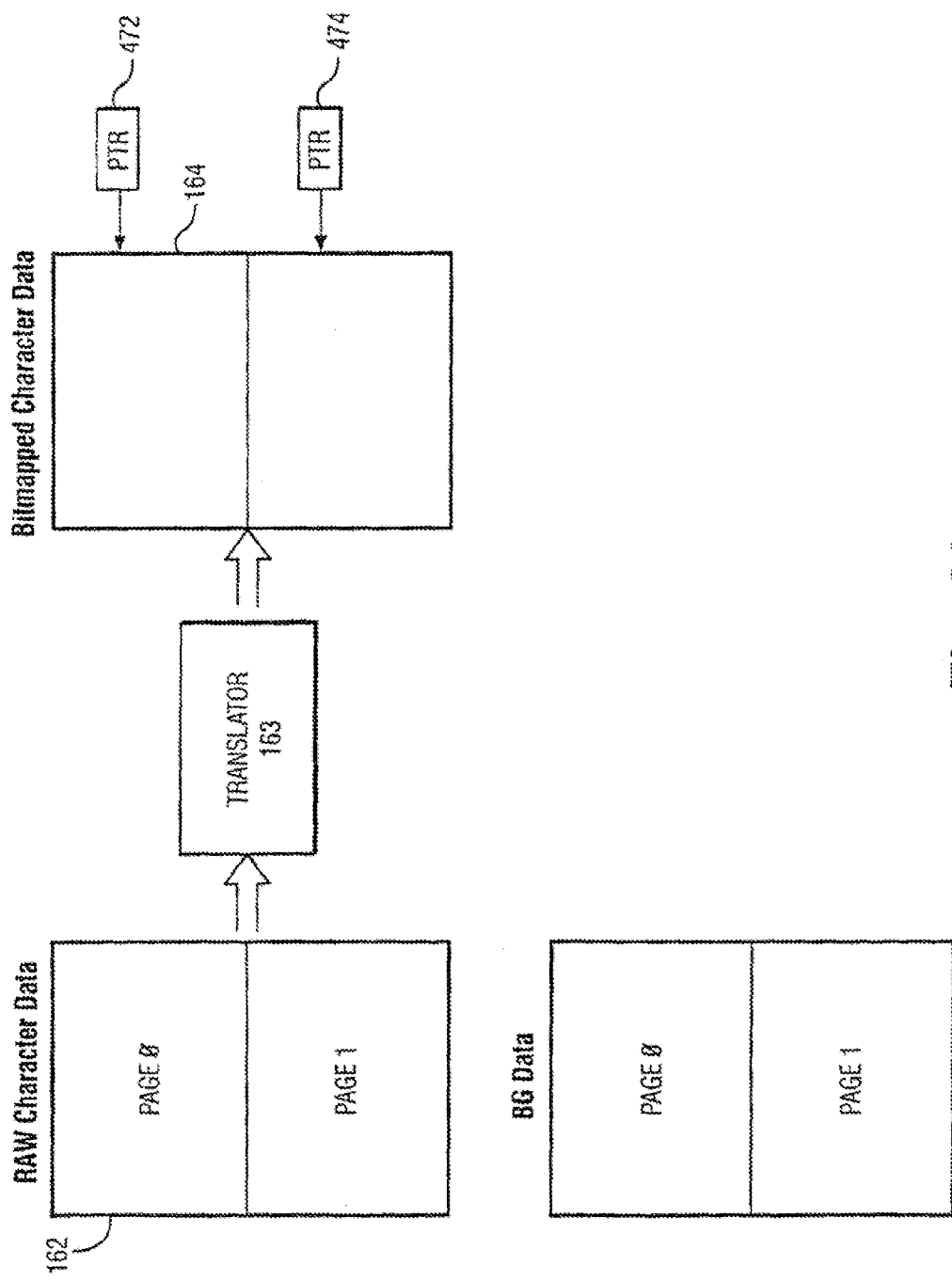
*Fig. 20* EXAMPLE GRAPHICS EMULATION

EXAMPLE CHARACTER DATA

Fig. 23 EXAMPLE GRAPHICS OBJECT POINTERS

EXAMPLE EMULATED OAM

EXAMPLE VIDEO MEMORY

Fig. 26 EXAMPLE GRAPHICS MODE SELECTORS

EXAMPLE SCREEN LAYOUT

Fig. 28 EXAMPLE VGA MODE CONTROL

| | |
|---|---|
| VIDEO_INT | 0x10 |
| SET_MODE | 0x00 |
| VGA_256_COLOR_MODE | 0x13 |
| TEXT_MODE | 0x03 |
| REGISTER_MASK | 0x3C6 |
| COLOR_INDEX | 0x3C8 |
| PALETTE_REG | 0x3C9 |
| INPUT_STATUS_1 | 0x3DA |
| VRETRACE | 0x08 |

| | |
|---|---|
| GE_DESTINATION_BASE | 0x018 |
| GE_DESTINATION_PITCH | 0x028 |
| GE_DESTINATION_XY | 0x10000 |
| GE_HEIGHT | 0x048 |
| GE_PIXEL_DEPTH | 0x07C |
| GE_RASTER_OP | 0x08C |
| GE_SOURCE_BASE | 0x098 |
| GE_SOURCE_PITCH | 0x0AC |
| GE_SOURCE_XY | 0x0BC |
| GE_WIDTH | 0xC8 |

Fig. 29 EXAMPLE GRAPHICS ENGINE REGISTER INDEXES

HAND-HELD VIDEO GAME PLATFORM EMULATION

CROSS REFERENCE TO RELATED APPLICATIONS

This application is a Continuation application of U.S. application Ser. No. 10/690,818 filed Oct. 23, 2003, which is a divisional application of application Ser. No. 09/723,322 filed Nov. 28, 20000, now U.S. Pat. No. 6,672,963. This application is related to commonly-assigned application Ser. No. 09/722,410 filed Nov. 28, 2000 entitled PORTABLE VIDEO GAME SYSTEM, now U.S. Pat. No. 7,445,551, which is a continuation-in-part of application Ser. No. 09/627,440, filed Jul. 28, 2000, now abandoned. This application is also related to commonly-assigned application Ser. No. 09/321,201 of Okada et al filed May 27, 1999 entitled "Portable Color Display Game Machine and Storage Medium for The Same", now U.S. Pat. No. 6,315,669. Priority is also claimed from provisional application No. 60/233,622 filed Sep. 18, 2000 entitled "Method and Apparatus for Emulating a Portable Game Machine." Each of these related applications is incorporated herein by reference.

FIELD

This invention relates to systems, methods, techniques, data structures, and other features for running software applications including but not limited to video games on platforms different from the ones the software is intended or designed to run on.

BACKGROUND AND SUMMARY

Nintendo's GAME BOY® hand-held video game platforms have been extraordinarily successful. Nintendo released the first GAME BOY® in the late 1980s. Since then, this product and its successors (GAME BOY COLOR® and GAME BOY ADVANCE®) have captured the imaginations of millions of video game players throughout the world.

A wide number of different software applications (including but not limited to video games) have been designed to run on these platforms. People throughout the world enjoy these applications every day. One can see them being used on subways, at sports arenas, after school, and in a number of other contexts. See FIG. 1A.

Nintendo's GAME BOY®, GAME BOY COLOR® and GAME BOY ADVANCE® are examples of platforms having specialized hardware that is optimized for low cost, excellent performance and good graphics. These devices are not really general purpose computers; rather, they are special-purpose devices with specialized capabilities particularly adapted to video game play. These special capabilities provide low cost and exciting video game play action with good graphics and sound.

While GAME BOY® platforms are inexpensive and have long battery life, there may be situations in which it would be desirable to play or use applications developed for GAME BOY® on other platforms. For example, an airline, train or other vehicle passenger might want to play video games during a long journey. As shown in FIG. 1B, airlines are installing seat-back computer displays into the backs of airline seats. Such seat-back displays may provide a low cost personal computer including a processor, random access memory, liquid crystal display and input device(s). Similar displays could be installed in other vehicles (e.g., trains, ships, vans, cars, etc.) or in other contexts (e.g., at walk-up kiosks, within hotel rooms, etc.). It would be desirable under certain circumstances to allow users to execute all sorts of different applications including GAME BOY® video games and other applications using the general-purpose computer capabilities of such seat-back or similar display devices.

Personal computers have also proliferated throughout the world and are now available at relatively low cost. A trend has shifted some entertainment from the home television set to the home personal computer, where children and adults can view interesting web pages and play downloaded video games and other applications. In some circumstances, it may be desirable to allow users to play GAME BOY® video games on their home personal computers (see FIG. 1C).

A wide variety of so-called personal digital assistants (PDA's) have become available in recent years. Such devices now comprise an entire miniature computer within a package small enough to fit into your pocket. Mobile cellular telephones are also becoming increasingly computationally-intensive and have better displays so they can access the World Wide Web and perform a variety of downloaded applications. In some circumstances, it may be desirable to enable people to play GAME BOY® video games and other GAME BOY® applications on a personal digital assistant, cellular telephone or other such device (see FIG. 1D).

The special-purpose sound and graphics circuitry provided by the GAME BOY® platforms is not generally found in the various other platforms shown in FIGS. 1B, 1C and 1D. Providing these missing capabilities is one of the challenges to running a GAME BOY® video game (or other GAME BOY® application) on these other target platforms.

Another challenge relates to instruction set compatibility. Nintendo's GAME BOY® is based on an older, relatively inexpensive microprocessor (the Zilog Z80) that is no longer being used in most modern general purpose computer systems such as personal computers, seat-back displays and personal digital assistants. The Z80 instruction set (the language in which all GAME BOY® games and other GAME BOY® applications are written in) is not directly understood by the more modern Intel microprocessors (e.g., the 8086, 80286, 80386, Pentium and other processors in the Intel family) that are now widely used and found in most personal computers, seat-back displays, personal digital assistants, and the like. While it is possible to "port" certain GAME BOY® games or other applications to different microprocessor families (e.g., by cross-compiling the source code to a different target microprocessor), there may be an advantage in certain contexts to being able to play or execute the same binary images stored in GAME BOY® cartridges on target platforms other than GAME BOY®.

One way to provide a cross-platform capability is to provide a GAME BOY® software emulator on the target platform. Generally, a software emulator is a computer program that executes on a desired target platform (e.g., a seat-back display device, a personal computer or a personal digital assistant shown in FIGS. 1B-1D) and uses software to supply native platform capabilities that are missing from the target platform. For example, a software emulator may perform some or all of GAME BOY®'s specialized graphics functions in software, and may interface with whatever graphics resources are available on the target platform to display resulting images. A software emulator may translate or interpret Z80 instructions so the microprocessor of the target platform can perform the functions that GAME BOY® would perform if presented with the same instructions. The software emulator may include software code that emulates hardware capabilities within the GAME BOY® circuitry (e.g., audio and/or graphics processing) and/or translate associated GAME BOY® application requests into requests that can be handled by the hardware resources available on the target platform. For example, the target platform may include a graphics adapter and associated display that is incompatible with GAME BOY®'s graphics hardware but which can perform some of the basic graphics functions required to display GAME BOY® graphics on a display.

A number of GAME BOY® emulators have been written for a variety of different platforms ranging from personal digital assistants to personal computers. However, further improvements are possible and desirable.

One area of needed improvement relates to obtaining acceptable speed performance and high quality sound and graphics on a low-capability platform. A low-capability platform (e.g., a seat-back display or a personal digital assistant) may not have enough processing power to readily provide acceptable speed performance. Unless the software emulator is carefully designed and carefully optimized, it will not be able to maintain real time speed performance when running on a slower or less highly capable processor. Slow-downs in game performance are generally unacceptable if the average user can notice them since they immediately affect and degrade the fun and excitement of the game playing experience.

Performance problems are exacerbated by the penchant of some video game developers to squeeze the last bit of performance out of the GAME BOY® platform. Performance tricks and optimizations within a GAME BOY® application may place additional demands on any emulator running the application. Some prior art emulators provide acceptable results when running certain games but unacceptable results (or do not work at all) for other games. An ideal emulator provides acceptable results across a wide range of different games and other applications such that the emulator can run virtually any game or other application developed for the original platform.

Another challenge to designing a good software emulator relates to maintaining excellent image and sound quality. Ideally, the software emulator running on the target platform should be able to produce graphic displays that are at least the same quality as those that would be seen on the native platform. Additionally, the color rendition and other aspects of the image should be nearly if not exactly the same. Sounds (e.g., music and speech) from the emulator should have at least the same quality as would be heard on the original platform. All of these capabilities should be relatively closely matched even on platforms with radically different sound and graphics hardware capabilities.

One prior attempt to develop a video game platform emulator is disclosed in U.S. Pat. No. 6,115,054 to Giles. That patent describes a general purpose computer based video game platform software emulator including an execution skipping feature that evaluates the ability of the general purpose computer to generate video frames fully synchronized with the target platform computer system. If the evaluation determines that the emulator is falling behind the target system, the emulator executes only a first subset of the graphics commands while skipping execution of a second subset of graphics commands so as to partially render the frame. For example, the patent discloses fully executing certain graphics commands while partially executing others (e.g., clipped drawing commands) to provide a partial rendering of the frame. One disadvantage to the approach described in the Giles patent is that partial rendering of a frame can lead to uncertain imaging results that will degrade the quality of the image being produced by the emulator.

The present invention solves these and other problems by providing a unique software emulator capable of providing acceptable speed performance and good image and sound quality on even a low-capability target platform such as a seat back display for example.

The preferred embodiment software emulator provided by this invention maintains high-quality graphics and sound in real time across a wide variety of video games and other applications—and nearly duplicates the graphics and sound that would be experienced by a user of the GAME BOY®, GAME BOY COLOR® and/or GAME BOY ADVANCE® platform running the same game or other application. The preferred embodiment emulator achieves this through a unique combination of features and optimizations including, for example:

use of a virtual liquid crystal display controller (state machine) to maintain real time synchronization with events as they would occur on the native platform, use of a hardware-assisted bit BLIT memory transfer operation to efficiently transfer graphics information into video memory, pre-computed translation table for translating native platform graphics character formats into formats more compatible with standard graphics adapters, emulation of native platform color palette information to provide compatibility with games and other applications that change color palettes within a frame, emulation of major registers and other hardware-based memory structures within the native platform in RAM under software control, use of a jump table able to efficiently parse incoming binary instruction formats, use of a unique page table to control memory access by remapping memory access instructions into different memory locations and/or function calls, availability of a ROM protection function to eliminate ROM overwriting during emulated operations, responsive to video game compatibility modes and registration data, models native platform using state machine defining search, transfer, horizontal blank and vertical blank states, cycle counter to determine when a modeled state has expired and transition to a new state is desired.

selective frame display update skipping while maintaining execution of all instructions to maintain state information while minimizing game play slowdowns, optional NOP loop look ahead feature to avoid wasting processing time in NOP loops, redundant emulated RAM and ROM storage to optimize execution efficiency, separate page tables for read and write operations, modeling of native microprocessor registers as a union of byte, word and long register formats, modeling native instruction CPU flags to allow efficient updating after operations are performed by target platform microprocessor, mapping emulated program counter into target platform microprocessor general purpose register, reads and writes via index register go through pointer tables to increase execution efficiency, adaptable input controller emulator to provide user inputs from a variety of different user input devices, emulated object attribute memory, and use of screen memory buffers larger than screen size to increase paging efficiency by eliminating clipping calculations and using the hardware BitBlt to transfer a subset of the memory buffer to displayed video memory.

BRIEF DESCRIPTION OF THE DRAWINGS

These and other features and advantages provided by the invention will be better and more completely understood by referring to the following detailed description of presently preferred embodiments in conjunction with the drawings, of which:

FIG. 3 is a block diagram of example functional models of the FIG. 2 emulator;

FIG. 6 shows example compatibility modes;

FIG. 7 shows example registration data locations;

FIG. 9C shows example state machine cycle parameters;

FIGS. 19A and 19B show example additional emulator control registers;

FIG. 20 shows an example graphics emulation optimization;

FIG. 28 shows example VGA mode control parameters; and

FIG. 29 shows example graphics engine register indices.

DETAILED DESCRIPTION

Figure 1A:
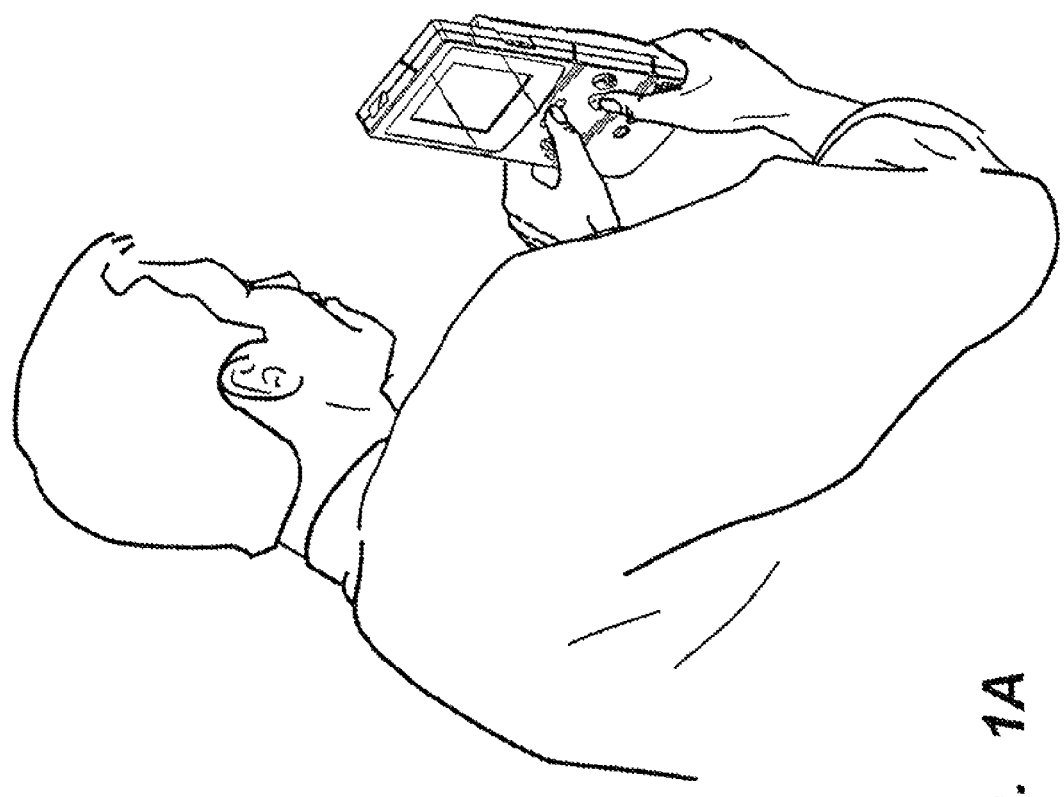
FIG. 1A shows someone playing a Nintendo GAME BOY® portable video game platform.
Figure 1B:
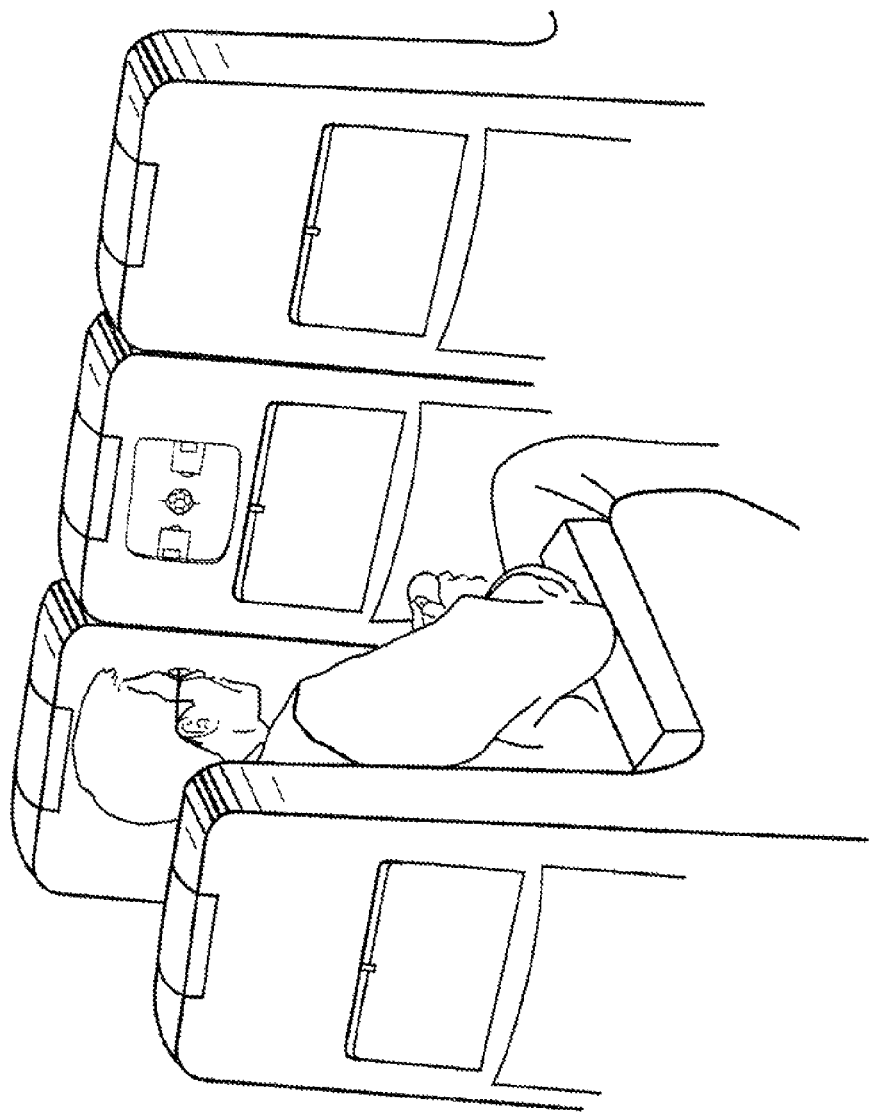
FIGS. 1B-1D show various different target platforms that could be used to emulate the FIG. 1 GAME BOY®.
Figure 1C:
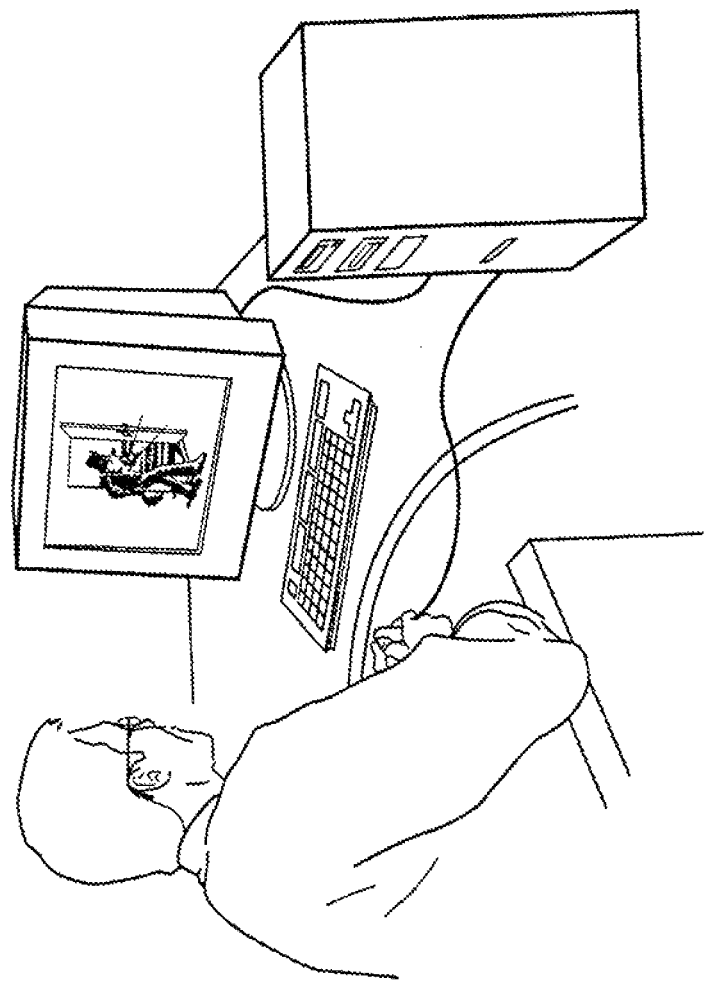
Figure 1D:
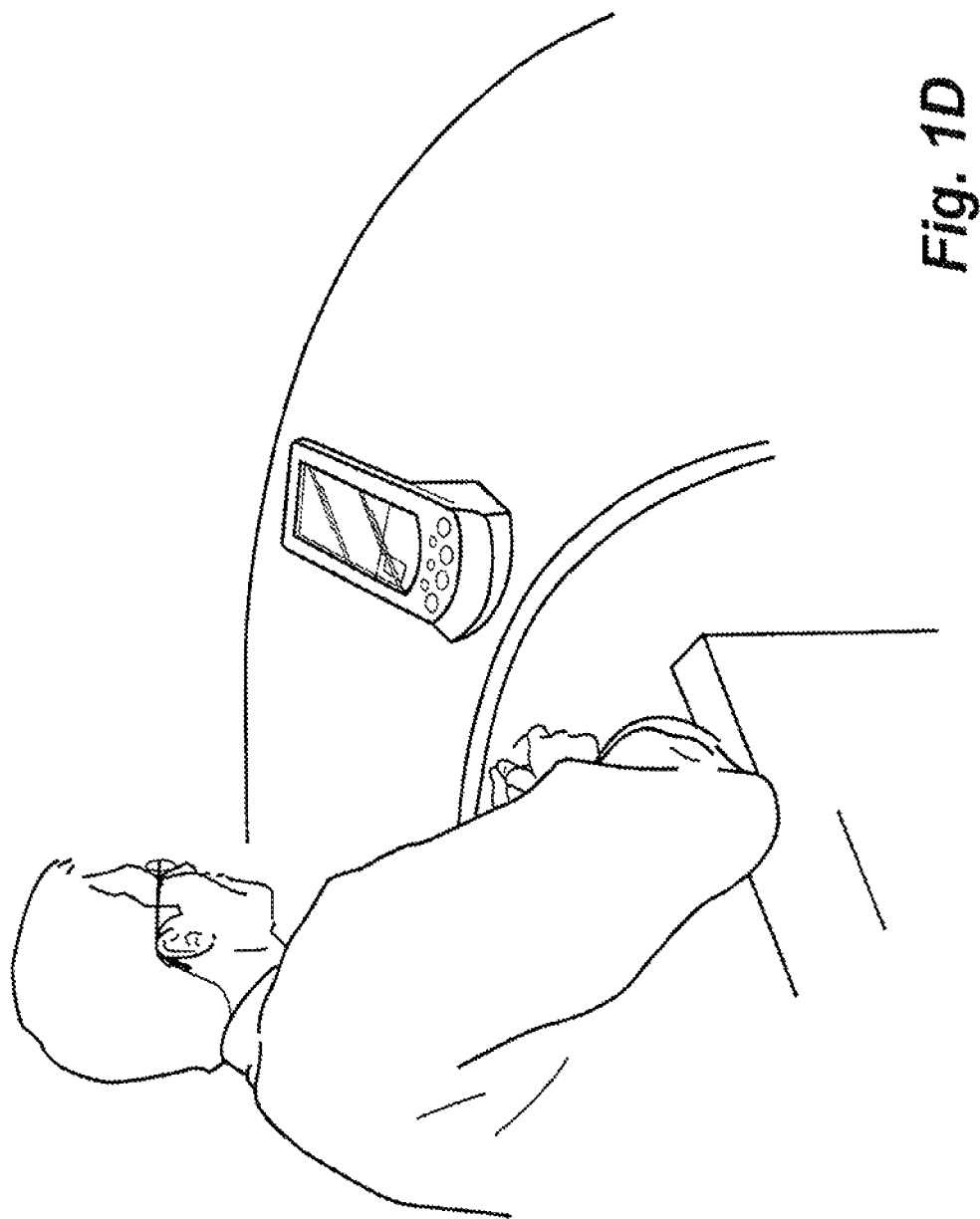
Figure 2:
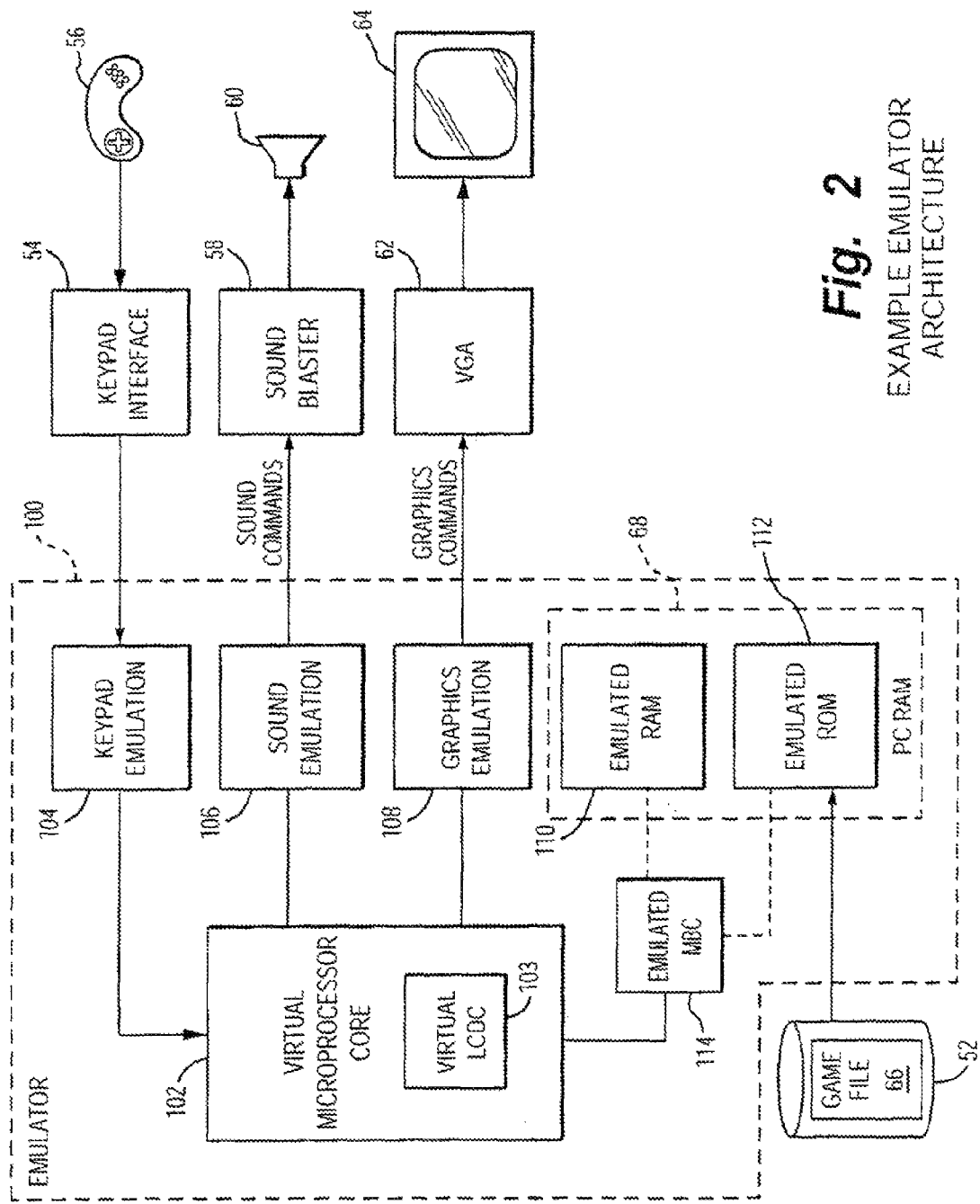
FIG. 2 is a block diagram of an example software emulator architecture.

FIG. 2 shows an example software emulator 100 provided by a preferred embodiment of the invention. Emulator 100 is designed to operate on a target platform of the type shown in FIG. 1B above, but could run on any desired platform including, for example, the target platforms shown in FIGS. 1C and 1D.

In the example embodiment, the target platform includes:
a microprocessor (e.g., an Intel 386);
a disk or other file system 52;
a keypad interface 54 coupled to a handheld controller 56;
a sound blaster or other audio interface card 58 coupled to a loud speaker or other sound transducer; and
a VGA or other graphics adapter 62 that outputs video information to a display 64 such as a liquid crystal display screen or video monitor.

Figure 2A:
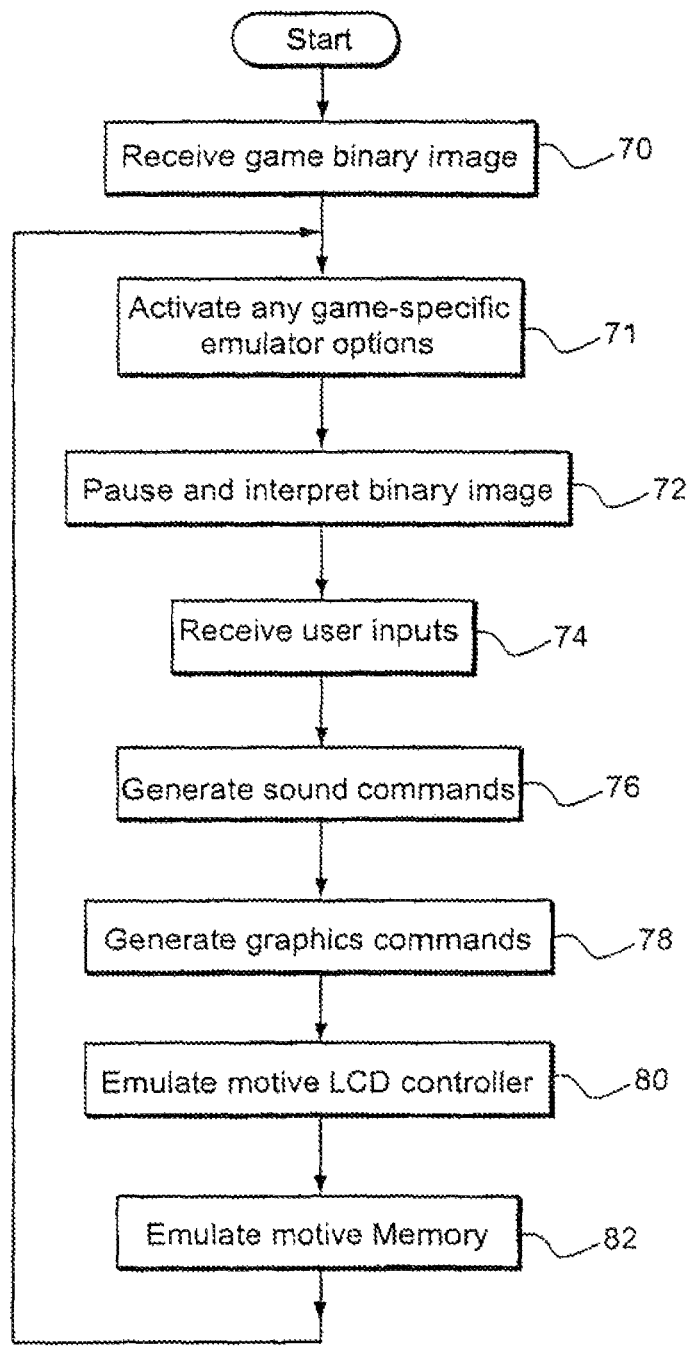
FIG. 2A is a flow chart of example overall software emulator steps.

Emulator 100 (which executes on the target platform microprocessor and uses the resources of the target platform) receives the binary image of a game (or other application) file 66 stored on disk or other file system 52 (FIG. 2A block 70). Emulator 100 parses and interprets this binary image (FIG. 2A block 72). Emulator 100 also receives user inputs from handheld controller 56 via target platform keypad interface 54 (FIG. 2A block 74). In response to these inputs, emulator 100 generates sound commands for the audio adapter 58 (FIG. 2A block 76) and generates graphics commands for application to the video graphics adapter 62 (FIG. 2A block 78)—creating sounds on audio transducer 60 and images on display 64. These sounds and images nearly duplicate what one would hear and see if running file 66 on a native GAME BOY® platform.

In the example embodiment, the game file binary image 66 can be a video game or any other application that can run on a GAME BOY®, COLOR GAME BOY® or GAME BOY ADVANCE®. Binary image 66 includes binary audio commands and binary graphics commands, compatible with a GAME BOY® native platform but which are not compatible with the application programming interface features of audio interface 58 and VGA adapter 62. Emulator 100 interprets those graphics commands and sound commands, and generates a corresponding sequence of graphics and sound commands that are understandable by and compatible with the audio and sound capabilities of the target platform.

In the example embodiment, emulator 100 includes a virtual microprocessor core 102. Virtual microprocessor core 102 interprets instructions within the binary game file 66 that would be executed by the actual GAME BOY® native platform (Z80) microprocessor (FIG. 2A block 72), and provides a corresponding sequence of microprocessor instructions for execution by the target platform microprocessor (which in the general case, is different from the microprocessor found in GAME BOY® and does not understand and is incompatible with the native platform microprocessor instruction set).

Virtual microprocessor core 102 receives inputs from a keypad emulation block 104 (FIG. 2A block 74). Block 104 in turn, receives interactive inputs from the user via target platform keypad interface 54. Keypad emulator block 104 emulates the GAME BOY® control input circuitry and associated functionality and translates inputs received from the target platform keypad interface—which may have a different set of control inputs and configurations from that found in a GAME BOY® native platform.

Virtual microprocessor core 102 also communicates with sound emulation block 106 and graphics emulation block 108. Sound emulation block 106 emulates or simulates the sound generation circuitry within a GAME BOY®, GAME BOY COLOR® and/or GAME BOY ADVANCE® to provide a set of sound commands for application to the target platform sound adapter 58 (FIG. 2A block 76). Graphics emulation block 108 emulates or simulates the hardware acceleration and other graphics circuitry found within a GAME BOY®, GAME BOY COLOR® and/or GAME BOY ADVANCE® platform to provide a set of graphics commands for application to a target platform graphics adapter 62 (FIG. 2A block 78).

In the example embodiment, virtual microprocessor core 102 also includes a virtual liquid crystal display controller 103 used for the purpose of maintaining timing. Events within the GAME BOY®, GAME BOY COLOR®, and GAME BOY ADVANCE® native platforms are generally driven by activities relating to updating the liquid crystal display every one-sixtieth of a second. The example embodiment of emulator 100 emulates the native platform liquid crystal display controller (FIG. 2A block 80) in order to synchronize events occurring within the emulator with emulated events that would occur within a GAME BOY®, GAME BOY COLOR®, and/or GAME BOY ADVANCE® native platform. As will be described below in detail, the virtual liquid crystal display controller 103 of the example embodiment does not actually perform any display functions, but rather is used to tell emulator 100 what would be going on in terms of display timing on a real GAME BOY®, GAME BOY COLOR®, or GAME BOY ADVANCE®. A virtual liquid crystal display controller 103 allows emulator 100 to synchronize its pace with what the pace of a real GAME BOY®, GAME BOY COLOR®, and/or GAME BOY ADVANCE® native platform would be running the same application file 66. Virtual liquid crystal display controller 103 may be viewed as a software-implemented model of the event timing sequence of a GAME BOY®, GAME BOY COLOR®, and/or GAME BOY ADVANCE® native platform.

Emulator 100 also includes an emulated random access memory 110, an emulated read only memory 112, and an emulated memory bank controller (MBC) 114. Emulated random access memory 110 and emulated read only memory 112 provide memory storage locations within the (read/write) random access memory 68 of the target platform. The emulated random access memory 110 emulates or simulates the random access memory of a GAME BOY®, GAME BOY COLOR® and/or GAME BOY ADVANCE®, and the emulated read only memory 112 emulates or simulates the read only memory within the game cartridge of a GAME BOY®, GAME BOY COLOR® and/or GAME BOY ADVANCE® (FIG. 2A block 82). The emulated memory bank controller 114 emulates or simulates the hardware memory bank controller (bank switching) circuitry found within certain a GAME BOY®, GAME BOY COLOR® and/or GAME BOY ADVANCE® game cartridges.

FIG. 2A shows example steps performed by emulator 100. The emulator receives a binary game image (block 70) and activates any game-title-specific emulator options (block 71). The example emulator 100 parses and interprets the game binary image (block 72) and receives user inputs (block 74). The example emulator 100 generates sound commands (block 76) and graphics commands (block 78). The example emulator 100 emulates a native liquid crystal display controller (block 80) and native memory (block 82).

Example Emulator Functional Modules

FIG. 3 shows a breakdown of example illustrative functional modules used to implement the FIG. 2 emulator in software. These functional modules include:

run game module 120,
emulate module 122,
draw_COB module 124,
draw_DMG module 126,
draw_AGR module 128,
ROM authentication check ("ROM REG") module 130,
video module 132,
VGA module 134,
buttons module 136,
sound module 138,
no write module 140,
port mode module 142,
COB RAM module 144,
DMA module 146,
MBC module 148,
SIO module 150,
ADDPTRS module 152, and
timer module 154.

The example functional modules shown in FIG. 3 provide various functions that can be called by name from other parts of the emulator code. Each of these functional modules may be implemented with a C or C++ and/or assembler function or other routine in one example implementation. In this particular implementation, the entire executable file (the aggregate of all modules) is designed as a DOS protected mode application that runs with a minimum number of drivers to maximize efficiency.

The run game functional module 120 loads the game file 66 into emulated ROM 112 and then calls the emulate functional module 122 (FIG. 2A block 70). The run game module 120 may also by itself (or in conjunction with an additional function if desired) initialize each of the hardware-handler modules within the emulator 100. Emulate functional module 122 is the main emulation loop and is executed until the user quits the game or other application.

In the example embodiment, the draw functional modules 124, 126, 128 perform the task of drawing graphics objects generated by emulator 100 by sending graphics commands to the graphics adapter 62 (FIG. 2A block 78). For example, the draw_COB functional module 124 may draw each of 144 color background lines of the COLOR GAME BOY® on the screen and may also by itself (or in conjunction with another module) draw the moving objects after the background has been drawn. The draw_DMG functional module 126 performs a similar drawing task for original GAME BOY® games and other applications, and the draw_AGB functional module 128 performs similar drawing tasks for GAME BOY ADVANCE® games and other applications. Example emulator 100 is capable of emulating any/all of a number of different platforms across the Nintendo GAME BOY® product line.

In this example, the ROM check ("ROM REG") functional module 130 is used to check (and/or display) registration data within the game file 66. This functional module 130 is used to ensure, for example, proper authorization on the part of the user before game play is allowed. In another embodiment, the ROM registration module does not do anything regarding user authorization, but just reads the ROM registration data in the game file, sets emulator variables and optionally displays the registration data on the screen. A game file validation function may be included in the ROM registration module to validate the game file, not the user.

The video functional module 132 is used in the example to transfer character graphics data. The functions in the video module 132 perform character bitmap translation for any type of write to the character RAM area, whether it is a direct write from the CPU or a DMA transfer. Functions in the video module also handle the RAM bank switching register for character data areas, control and status registers for the LCD controller and palette registers for both COB and DMG modes. When a game file 66 instruction calls for a direct memory access data transfer of character information into the GAME BOY® character RAM space, video functional module 132 performs a character bit map translation into a portion of emulated RAM 110 to prepare graphics characters for display. The video functional module 132 may, by itself or in conjunction with another functional module, place appropriate function pointers into appropriate input/output read/write tables for all of the register handling functions that should be performed.

In the example embodiment, the VGA functional module 134 is used to set the appropriate video mode of the target platform graphics adapter 62. In addition, this VGA functional module 134 may be responsible for transferring full screens of graphics data to VGA graphics adapter 62 under certain circumstances (e.g., if a hardware-assisted bit BLIT operation is not available on the target platform).

The buttons functional module 136 is responsible for getting the keypad data from keypad interface 54 and writing this data into a set of input interface registers that emulate actual hardware interface registers within GAME BOY®, GAME BOY COLOR® and/or GAME BOY ADVANCE®.

The sound functional module 138 in the example embodiment generates and writes appropriate sound information to the target platform sound adapter 58 by translating writes to the virtual sound registers to appropriate sound information for the target platform sound adapter (FIG. 2A block 76). The sound functional module 138, by itself or in conjunction with another functional module, may also be used to put function pointers into appropriate input/output, read/write tables for all of the register handling functions performed by the sound functional module.

In this example module, the no write functional module 140 protects the emulated ROM 112 from being written to (thus making sure this memory segment is emulated as a read only memory as opposed to a read-write memory during game play). The no write functional module 140, by itself or in conjunction with an additional functional module, may place appropriate function pointers into the appropriate input/output read/write tables for all of the register handling functions in the no write functional module.

The port mode functional module 142 emulates a CPU timer and provides a keypad handler. It has functions that handle the keypad, the timers, and the CPU speed control (e.g., to provide a CPU speed change operation since COLOR GAME BOY® operates twice as fast as GAME BOY® and GAME BOY ADVANCE operates still faster). The port mode functional module 142 may also set appropriate function pointers or call an additional function module(s) to perform this task. The main function of the CPU timer is to generate CPU interrupts at specified intervals. Registers to specify this interval are handled in the port/mode module. There are a couple of registers that provide real-time views of a free-running counter. These registers can be emulated by returning a random number. This is only a partial emulation (a random number is not a real time value). However, the most common use of these registers by games is to generate a random number by looking at a fast clock at an arbitrary point in time. It is therefore possible to completely satisfy such games by providing a random number as opposed to a real time clock indication. A more accurate emulation can be provided if a game requires the real-time view of the counter actually provided in the native hardware.

The CGB RAM functional module 144 emulates the COLOR GAME BOY® RAM to provide (additional) emulated RAM 110. DMA functional module 146 performs direct memory access transfers between the various emulated storage resources within emulator 100—thereby emulating the GAME BOY® native platform DMA controller. The MBC functional module 148 emulates the native platform memory bank controller to provide emulated MBC 114.

The SIO functional module 150 emulates a serial input/output port available on a GAME BOY®, GAME BOY COLOR® and/or GAME BOY ADVANCE® platform (e.g., to provide a "game link" operation whereby plural platforms can exchange data over a cable or other communications interface). The ADDPTRS functional module 152 performs the task of registering various handlers for operation (in particular, it may contain a single function that all hardware support modules call to register their memory/function pointers in an I/O handler table, and accomplishes this by registering pointers for reading and writing to I/O addresses). The timer functional module 154 implements the virtual liquid crystal display controller 103 by maintaining an emulated state machine that, keeps track of the state and associated timing information of a GAME BOY®, GAME BOY COLOR® and/or GAME BOY ADVANCE® platform. Timer module 154 thus allows the target platform (which may operate at a completely different speed from the original platform) to maintain a sense of the event timing as those events would occur on the native platform—ensuring that emulator 100 provides event timings that are consistent with the native platform. Without such timing information, the speed of the application's graphics and/or sound might be different on the emulator 100 as compared to on the original platform—resulting in an unsatisfying game play experience.

Example Memory Objects and Data Structures

Figure 4:
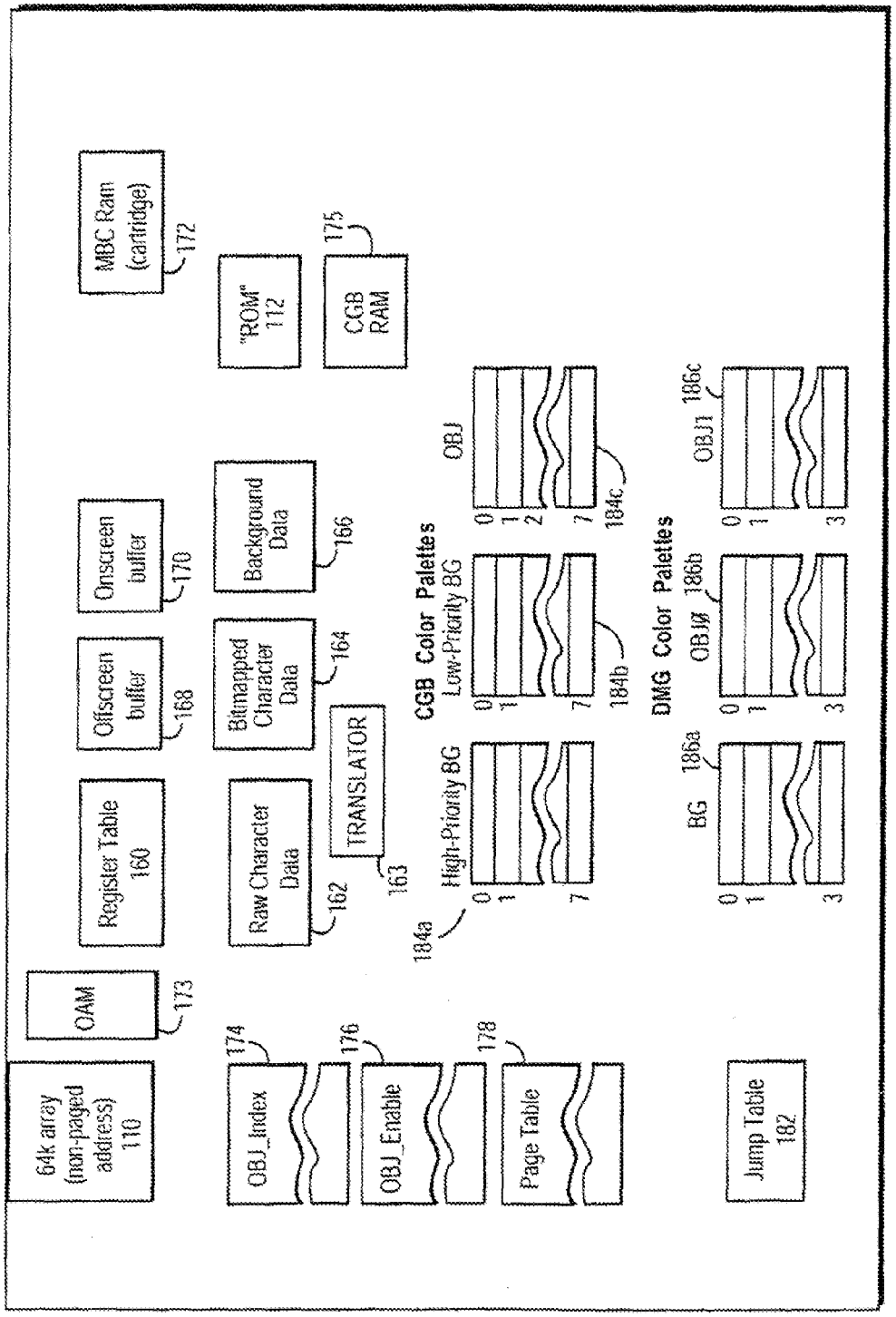
FIG. 4 is a block diagram of example emulator memory objects/data structures.

FIG. 4 is a block diagram of exemplary memory objects/data structures that emulator 100 maintains in the random access memory 68 of the target platform. In some cases, these data structures emulate hardware resources of the native platform. In other cases, these data structures do not correspond directly to any part of the native platform but instead provide support for optimized execution of emulator 100.

FIG. 4 shows the following exemplary data structures:
emulated "read only memory" 112,
emulated random access memory 110,
register table 160,
raw character data buffer 162,
translator 163
"bit-map-ized" character data buffer 164,
background data buffer 166,
off screen display buffer 168,
on screen display buffer 170,
memory bank switched (cartridge) RAM buffer 172,
object attribute memory buffer 173,
object index data structure 174,
CGB RAM buffer 175
object enable data structure 176,
page table 178,
jump table 182,
various color palettes including a high priority background palette 184*a*, a low priority background palette 184*b*, and an object color palette 184*c* for emulating COLOR GAME BOY®, and
various monochrome color (gray scale) palettes for GAME BOY® monochrome game emulation, including a background palette 186*a*, an object 0 palette 186*b* and an object 1 palette 186*c*.

The FIG. 4 data structures may be globally-defined memory arrays.

The main RAM array 110 is, in one example, a generic 64K memory array used for any non-paged address space. A CGB buffer 175 is used to emulate the internal RAM banks for COLOR GAME BOY®. MBC RAM 172 is used to emulate the random access memory that may be provided within certain game cartridges.

The object index array 174 may be used for sorting moving objects.

The object enable array 176 may include a flag for each display line indicating that drawing of moving objects was enabled for that line (flags may be sent/queried as the background is drawn).

Page table 178 may comprise a 64K table of pointers to the base pointers that handle each address, and may be used to reestablish the program counter on jumps, calls, returns, etc.

Page table 178 may be used for making pointer adjustments to both the program counter and the stack pointer. In another embodiment, a separate stack table comprising for example a 64K table can be used in a similar manner to page table 178, but with a coverage of each base pointer extending one address higher and used to reestablish the base of the stack pointer when it is manually changed.

The ROM pages 112 may be used to emulate the cartridge read only memory arrays (in the example embodiment, this ROM array is twice as big as the actual ROM pages since the bottom half is always duplicated).

The raw character data array 162 is used to store raw character data, and the further character data army 164 is used to store corresponding "bit map-ized" character data. A translator 163 is used to provide precomputed translation data for translating the raw character data 162 into the bit mapped character data 164. Different sets of pointers are used for each page and addressing mode in this example. The background data buffer 166 is used to store background data in pages 0 and 1.

The off screen buffer 162 (which may comprise an entry of 192×160×2) may be used to compose images off screen. This buffer may not be needed when a bit BLIT capability is available within the hardware of the target platform.

Color background palettes 184a, 184b comprise two sets of eight palettes, one for high priority background pixels and the other for low priority background pixels. Color object palette 184c provides object palette data to emulate the COLOR GAME BOY® object color palette (one set of eight palettes may be provided). GAME BOY® color palettes 186a, 186b, 186c emulate the monochrome GAME BOY® palettes, with background palette 186a providing four background palette data entries and object palettes 186b, 186c comprising object palette data for object 0 and object 1 (four entries per palette). The native COLOR GAME BOY® platform has selectable palettes for "colorizing" monochrome GAME BOY® games—and this capability may also be emulated by, for example, changing the color entries within palettes 186a, 186b, 186c. In another embodiment, these palettes 186 may be preassigned to provide certain default colors (e.g., red objects on a green background).

Jump table 182 is used to facilitate the parsing and execution of target instructions by emulator 100, as is explained below.

Example Emulated Cartridge ROM 112

Figure 5:
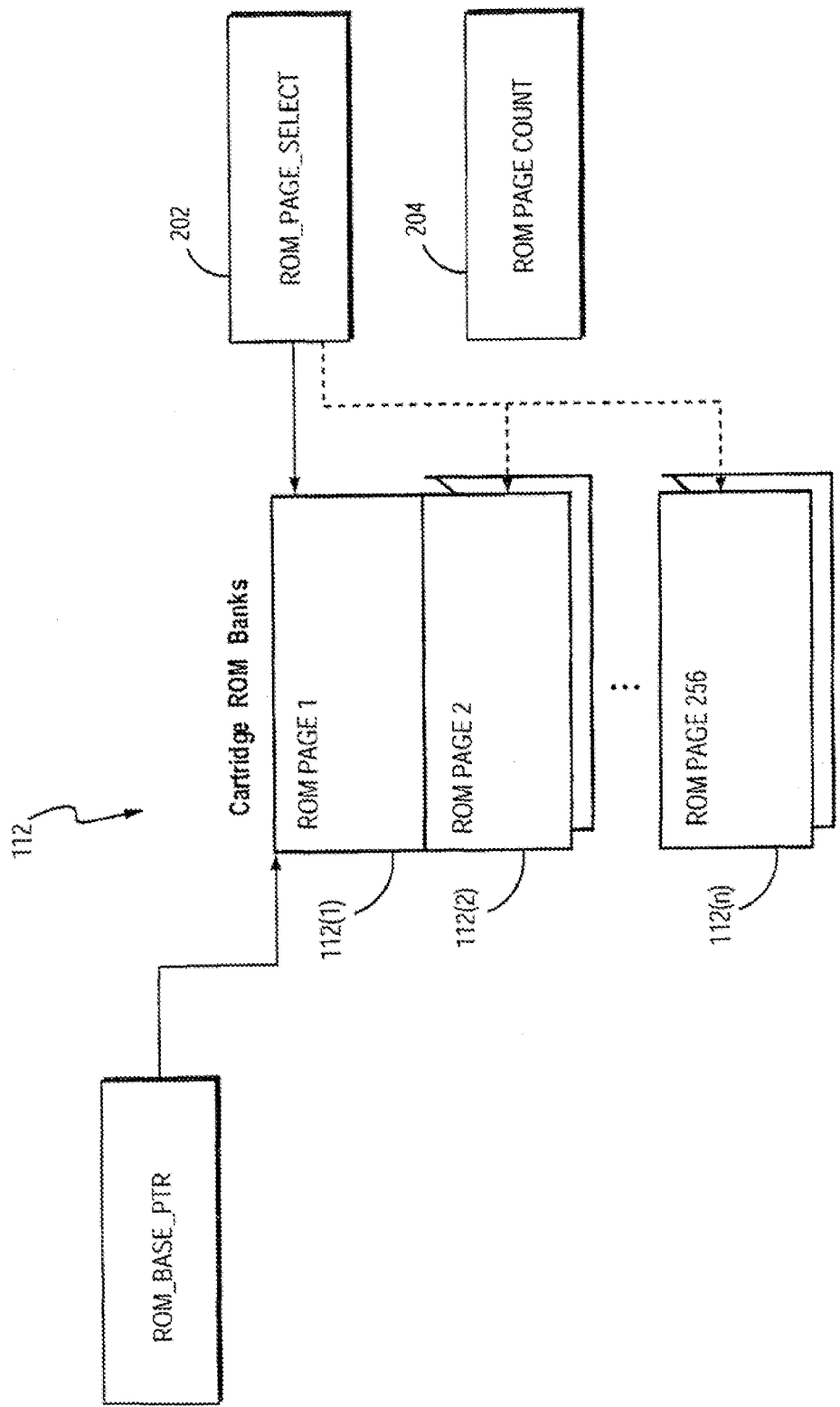
FIG. 5 shows an example emulated cartridge read only memory data structure.

FIG. 5 shows an example emulated cartridge ROM 112. In the native platform, the cartridge ROM may have a number of banks up to a maximum. Preferred embodiment emulator 100 emulates each of these banks with a different RAM page 112(1), 112(2), 112(n). In one example embodiment, the number of pages that may be allocated can be fixed (e.g., to a maximum of n=256) to provide static allocation for a four-megabyte game. In another embodiment, the number of ROM pages to allocate can be determined dynamically based on the particular game or other application.

In the example embodiment, the lower 16K in each allocated ROM page 112(1), . . . 112(n) is duplicated to facilitate page selection and reduce page swapping. A ROM page selection pointer 202 is used to select the current ROM page, and a ROM page count register 204 specifies the number of ROM pages loaded for the current game or other application. As mentioned above, the "no write" functional module 140 is used to protect the ROM space so that inadvertent write instructions within the application and/or emulator 100 do not succeed in overwriting emulated read only memory 112.

As mentioned above, the run game routine 120 is responsible for loading the game (application) file 166 into emulated ROM 112. Part of this loading operation loads particular compatibility information (see FIG. 6) and registration data (see FIG. 7) into the emulated ROM 112. The FIG. 6 compatibility information is used to specify whether an application is compatible or incompatible with certain native platforms (e.g., compatibility with the COLOR GAME BOY® mode of emulator 100, or whether it can run exclusively on the COLOR GAME BOY® mode). This compatibility information is present in a normal binary game file 166 to provide instructions to the COLOR GAME BOY® platform; emulator 100 reads and takes advantage of this information in determining its own emulation mode. The registration data shown in FIG. 7 is used in the example embodiment to ensure that game file 66 is authorized and authentic, and emulator 100 performs checks similar to those performed by the GAME BOY®, COLOR GAME BOY® and GAME BOY ADVANCE® native platforms (as well as possibly other security checks such as digital signatures, decryption, digital certificates, etc.) to ensure the user has proper authorization.

Example Virtual Liquid Crystal Controller 103 Implementation

In the example embodiment, emulator 100 uses an internal state machine to keep track of and emulate the states of an actual GAME BOY®, COLOR GAME BOY® or GAME BOY ADVANCE® platform during emulation operation. The emulator 100 could execute the instructions within game file 66 without keeping track of corresponding events within the native platform, but this would lead to loss of real time synchronization. In video game play, the pacing of the audio and video presentation is very important to the game play experience. Playing a game too fast or too slow will tend to destroy the fun oldie game It is therefore desirable to emulate a game playing experience that is close to or nearly the same as the game playing experience one would have when running the application on the original native platform.

Emulator 100 accomplishes this result by maintaining liquid crystal display controller 103 providing a sequential state machine that is synchronized with event states that would occur on the original native platform. Emulator 100 synchronizes its operation to the state transitions within this internal state machine to maintain real time synchronization of game play.

Figure 8:
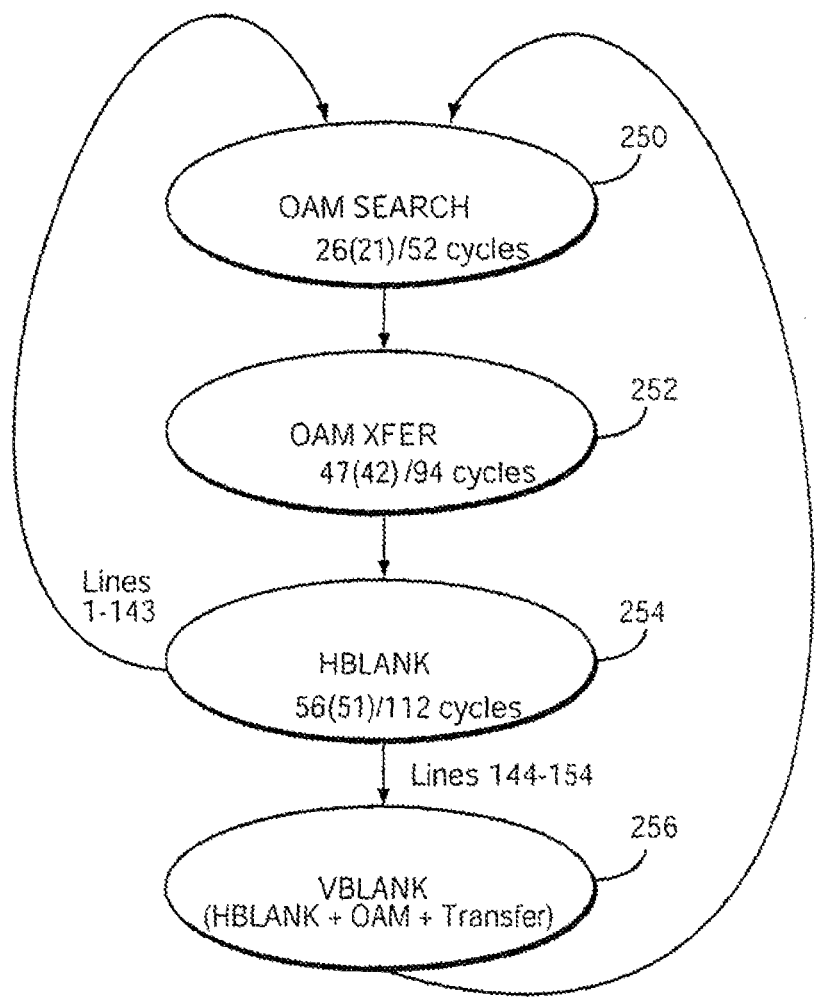
FIG. 8 shows an example virtual liquid crystal display controller state machine state diagram.

FIG. 8 shows an example four-state virtual state machine state transition diagram that can be maintained by virtual LCD controller 103. These states include:
- an object attribute memory search state 250,
- a memory transfer state 252,
- a horizontal blanking state 254, and
- a vertical blanking state 256.

Additional states (e.g., enable and disable) can also be provided.

In the example embodiment, the sequential progression through all four states 250-256 comprises a frame that results in the display of a new image on display 64. In the native platform, one frame comprises a vertical blanking state 256 and various repetitions of the hblank, OAM search and OAM transfer states 254, 250, 252 dependent on the number of lines (e.g., 144) within a frame. Because the native platform hardware is driven by line scanning operation of a liquid crystal display, so too is preferred embodiment emulator 100 driven by an emulated state machine that models the same line scanning and other time intervals to ensure proper game timing as the developers of the game intended it and as a user would see and experience a game on the native platform.

Within each line there is an hblank interval and associated state 254, as well as an OAM search state 250 (during which a native platform would search its object attribute memory for objects to be displayed on the next line) and an OAM transfer state 252 (during which a native platform transfers object character information into a line buffer for display). The table of FIG. 9C shows example cycle parameters for the FIG. 8 virtual state machine.

Figure 9A:
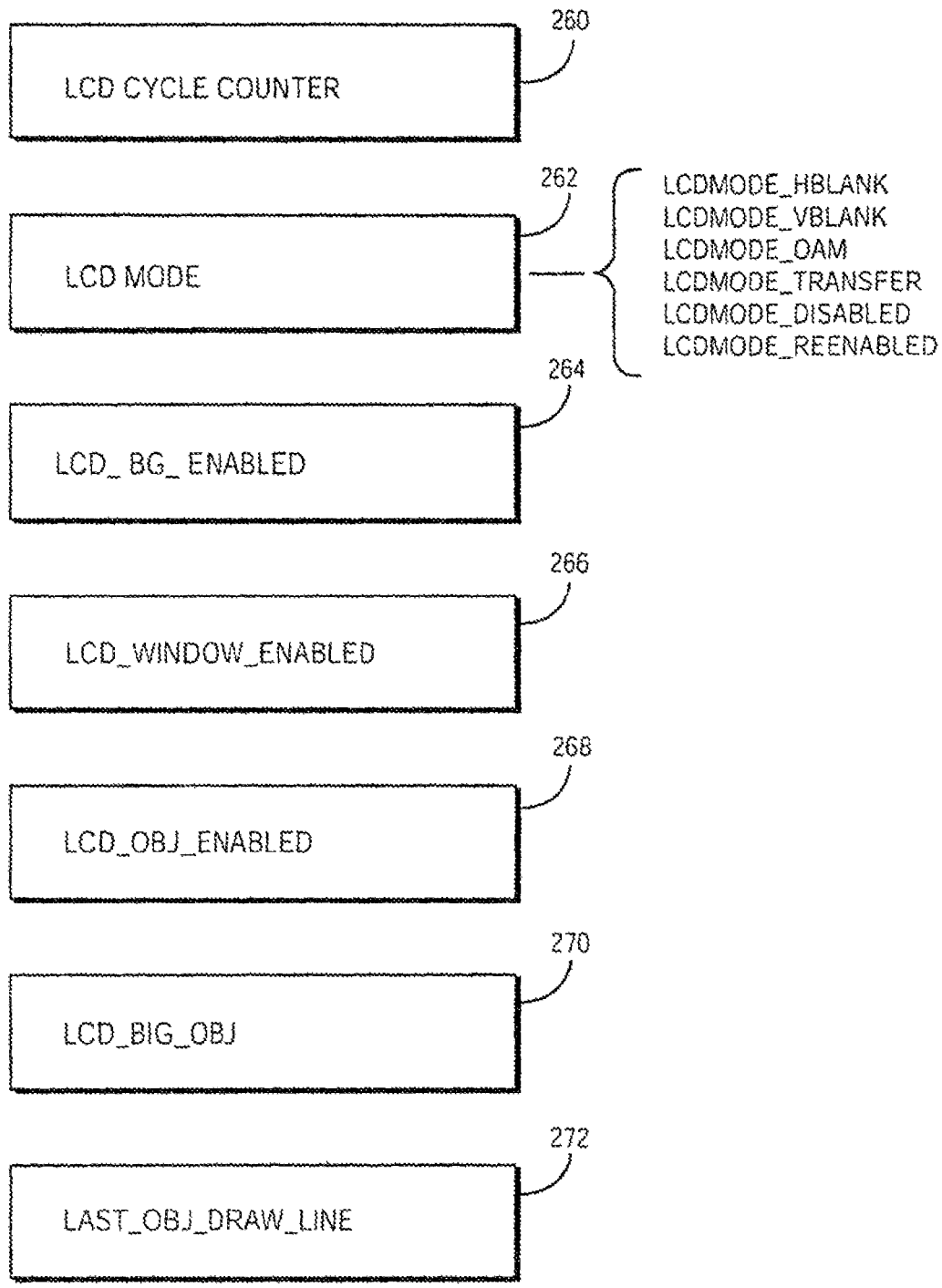
FIGS. 9A-9B show example virtual LCD controller emulation/control registers.
Figure 9B:
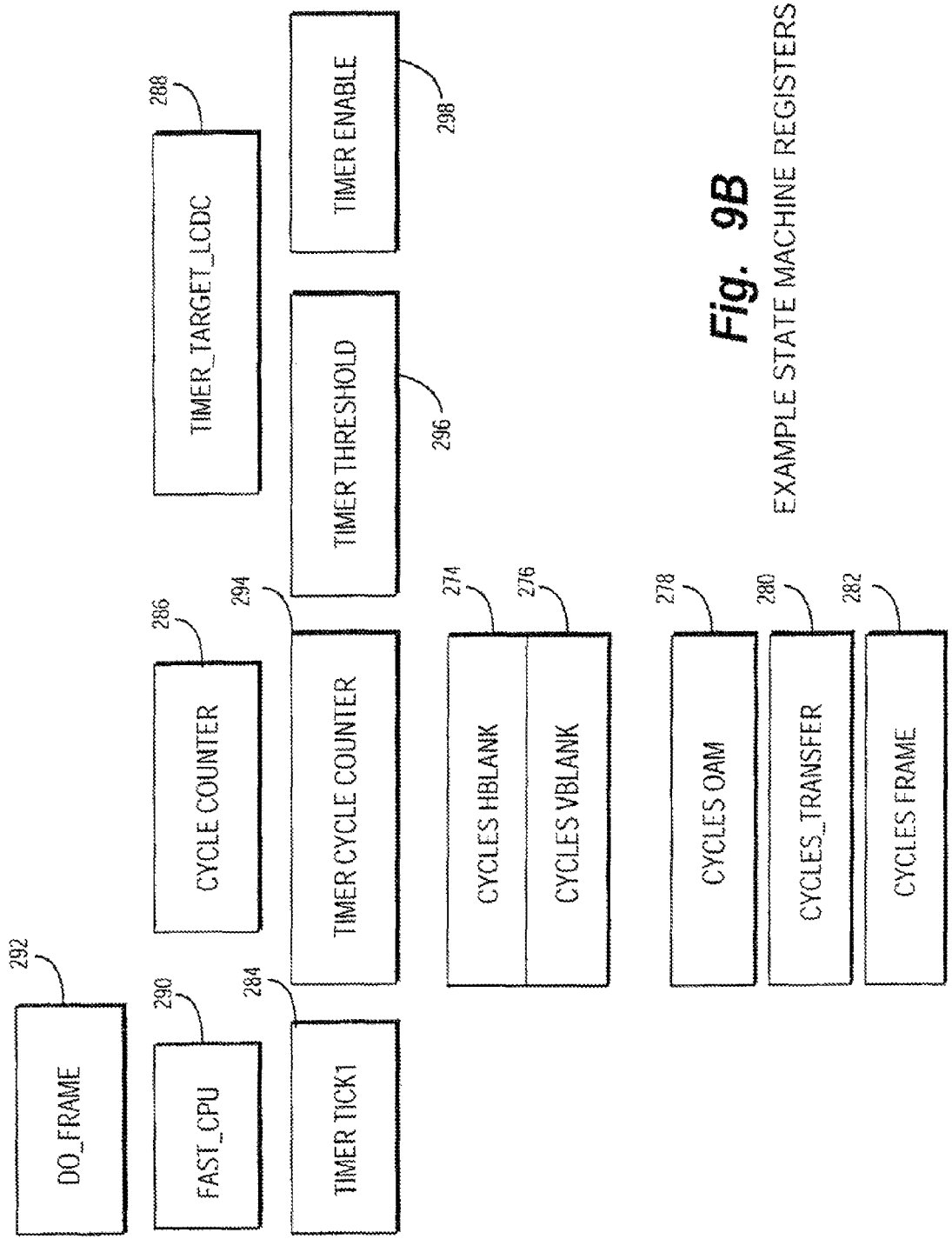

The preferred embodiment emulator 100 emulates a virtual state machine by maintaining the various registers shown in FIGS. 9A and 9B. The registers shown in FIG. 9A generally comprise various registers used to keep track of the virtual state and operation of a liquid crystal display controller that is being emulated. In this example, emulator 100 emulates a liquid crystal display controller using the following registers:

LCD cycle counter 260 (maintains the number of CPU cycles remaining before a transition to the next liquid crystal display controller phase/state should occur), liquid crystal display mode register 262 (maintains the current phase/state of the liquid crystal display controller including the various states shown in FIG. 8 as well as an additional disabled and re-enabled state), a liquid crystal display background enabled flag 264 (indicates whether the background should be drawn), a liquid crystal display window enabled flag 266 (indicates whether the current display window is enabled), a liquid crystal display object enabled flag 268 (indicates that the drawing of moving objects is enabled), a liquid crystal display big object flag 270 (indicates that objects are sixteen lines high instead of eight), a last object draw line register 272 (indicates the last line at which a direct memory access to object attribute memory occurred).

The FIG. 9B timing registers are used to maintain the various parameters pertaining to the timing parameters associated with the FIG. 8 virtual state machine. These registers include:

a cycleshblank register 274 (specifying the number of virtual CPU cycles needed in the horizontal blanking period), a cyclesvblank register 276 (indicating the number of virtual CPU cycles needed in the vertical blanking period), a cycles OAM (search) register 278 (indicating the number of virtual CPU cycles needed in the OAM search period), a cycles transfer register 280 (indicating the number of virtual CPU cycles need in the liquid crystal display data transfer period), a cycles frame register 282 (indicating the number of virtual CPU cycles needed for an entire frame), a timer ticks register 284 (this comprises a master game timer and is incremented by interrupt every $\frac{1}{60}^{th}$ of a second), a cycle counter 286 (this may be implemented by a local variable within the main emulation functional module 122 and is used to keep track of the current number of cycles within the frame), a timer target liquid crystal display counter flag 288 (this is a flag indicating when the cycle counter 286 reaches 0 in order to control the virtual liquid crystal display controller to transition to the next phase shown in FIG. 8), a fast CPU flag 290 (a flag indicating that the emulated COLOR GAME BOY® CPU is running in double-speed mode), a do frame flag 292 (a flag indicating whether emulator 100 should draw the current and/or next video frame or skip drawing it), a timer cycle counter 294 (indicates the number of CPU cycles remaining before a timer interrupt should be asserted), a timer threshold register 296 (indicates the number of CPU cycles corresponding to the current timer interrupt period), a timer enable register 298 (a flag indicating that timer interrupts are enabled).

Figure 10:
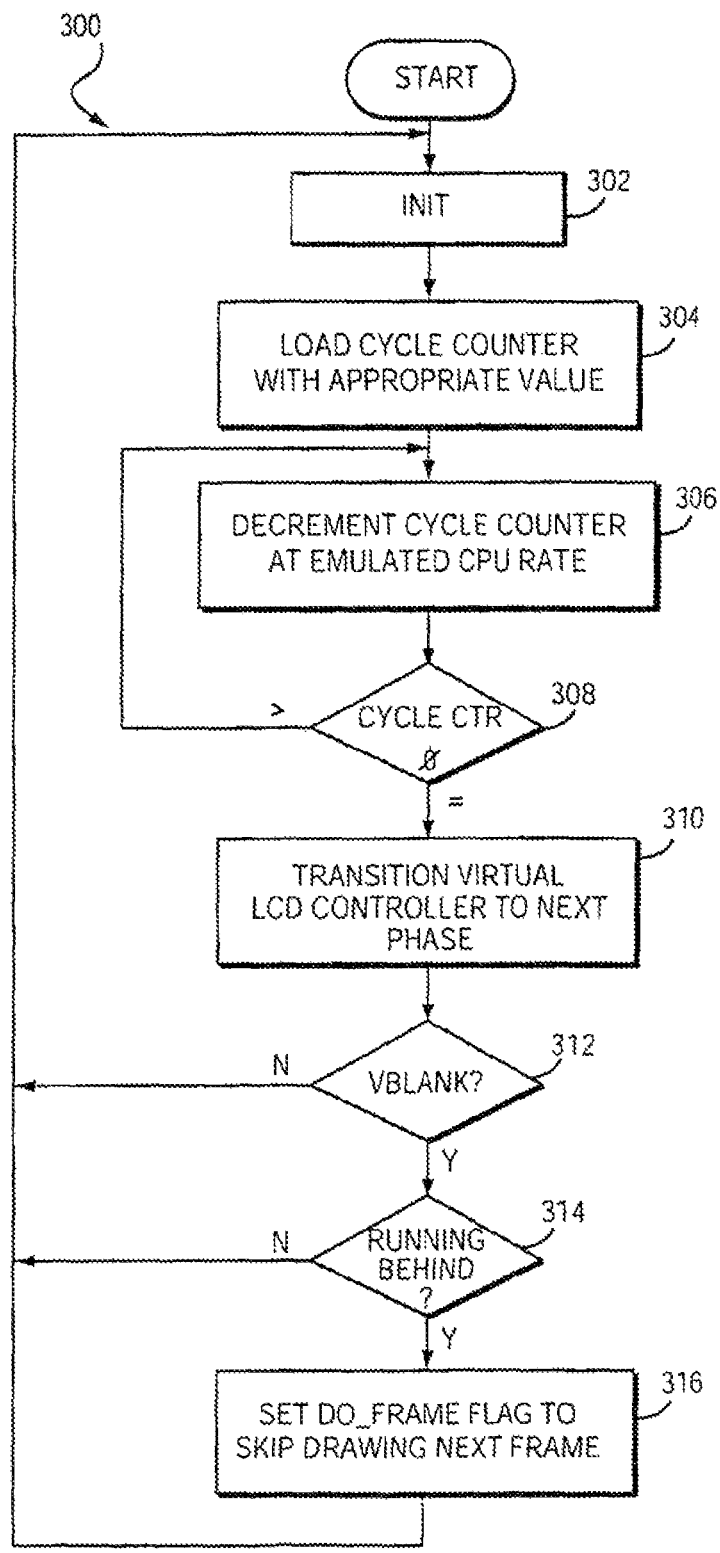
FIG. 10 shows an example flow diagram of an emulated liquid crystal display controller.

FIG. 10 is a flow diagram of an example emulated liquid crystal display controller 103. This flow diagram uses the various registers shown in FIGS. 9A and 9B to implement the FIG. 8 state machine. The FIG. 10 flow diagram has been simplified for purposes of illustration; additional operations may occur in an actual implementation. As shown in FIG. 10, the virtual state machine is initialized with an initial state by updating an express or implied state counter (state may be explicitly stored in register 262 or it may be implied through inline code for efficiency purposes if desired) (block 302). Then, the cycle counter register 286 is loaded with an appropriate number of cycles from the one of registers 274, 276, 278, 280 corresponding to the current state of the state machine (block 304, see FIGS. 8 and 9C). The cycle counter 286 is continually decremented at the emulated CPU rate (block 306) (as determined, for example, by the fast CPU flag 290) in response to timer ticks 284. This cycle counter 286 is continually compared with zero (decision block 308) to determine whether the current state is over. When the cycle counter has been decremented to zero (the "=" exit to decision block 308), the emulated LCD controller 103 transitions to the next state of the virtual state machine (see FIG. 8) (block 310). In the example embodiment, the cycle counter register is decremented by a fixed amount for each CPU instruction emulated. The effect of double-speed CPU operation is accomplished by loading the cycle counter with twice the number for each LCD controller phase than would be loaded for single-speed operation. So the cycle counter gets decremented at the same rate (which is determined by the speed of the host CPU), but the CPU can run through twice as many cycles per LCD phase in double-speed mode. Since the game speed is governed by throwing in an appropriate wait time once per frame in the example embodiment, the game speed is correct for both fast and slow modes, but in fast mode the CPU can do twice as much work.

If the next state is Vertical blanking ("yes" exit to decision block 312), then emulator 100 determines whether it is running behind (e.g., by determining the amount of time until the next timer interrupt is going to occur). Preferred embodiment emulator 100 tries to maintain the sixty frames-per-second screen update rate of the native platform. However, in one particular embodiment, it is not always possible (e.g., depending upon the particular game of other application being executed) to maintain a sixty frame-per-second rate on a slow target platform. In that example embodiment, emulator 100 dynamically scales back to a slower, thirty frame-per-second rate by setting the do-frame flag 292 ("yes" exit to decision block 314, block 316) which will have the result of entirely skipping the drawing of the next frame. In that example embodiment, this frame-skipping operation does not skip execution of any instruction from game file 66. All such instructions are executed by virtual microprocessor core 102 in order to continually maintain and update appropriate state information. Furthermore, this frame-skipping operation does not have the result, in the embodiment, of partially rendering the frame being skipped. For example, there is no selective execution of certain graphics commands in a command buffer depending on whether or not the emulator is falling behind. In that example embodiment of emulator 100, the only operations that are skipped are internal emulator 100 operations of transferring graphic information to the VGA graphics adapter 62 and updating the display 64—resulting in the frame either being rendered or not being rendered. Since the GAME BOY platforms operate to render an entire new frame each 1/60$^{th}$ of a second "from scratch", there is no need to partially render a frame for use in generating a next frame, and such a partial rendering would tend only to degrade speed performance and generate uncertain image results. A maximum of every other frame may be skipped in the example embodiment since using a frame update rate of less than 1/30$^{th}$ of a second would noticeably degrade image quality.

In a further embodiment, the "dynamic-scaling" feature is omitted from the emulator 100 to allow better emulation of transparency-based images. It turns out there are some games that achieve transparency effects by enabling and disabling the visibility of entities on the screen at a 30 fps rate (on for one frame, off the next). Allowing the emulator to skip "as needed" between 30 fps and 60 fps causes undesirable flickering in such games. In this alternate configuration, the emulator 100 may draw frames at either a fixed 30 fps (skip drawing of every other frame) or a fixed 45 fps (skip drawing of every third frame). Running at 30 fps causes the object to either always be visible or never be visible, depending on which phase you hit on. This is less than perfect emulation, but actually is the best solution for at least some games. For example, the 45 fps rate is currently used in certain games to make characters blink when they are hit by an enemy. Running at 45 fps (which provides acceptable game speed in certain games but not many other CGB games) allows you to alternate between visible and invisible and provides a good flickering character. If the emulator could draw at 60 fps, none of these problems would exist, but slow target hardware does not permit this. Luckily, 30 fps provides good game play for most games. It is possible to modify a few bytes (the "game code", which the emulator does not use) in the ROM registration area of the game file to tell the emulator what frame rate to use. There may be other game-specific emulation parameters put into the game file in the future.

Example Instruction Parsing/Execution By Virtual Microprocessor Core 102

Figure 11:
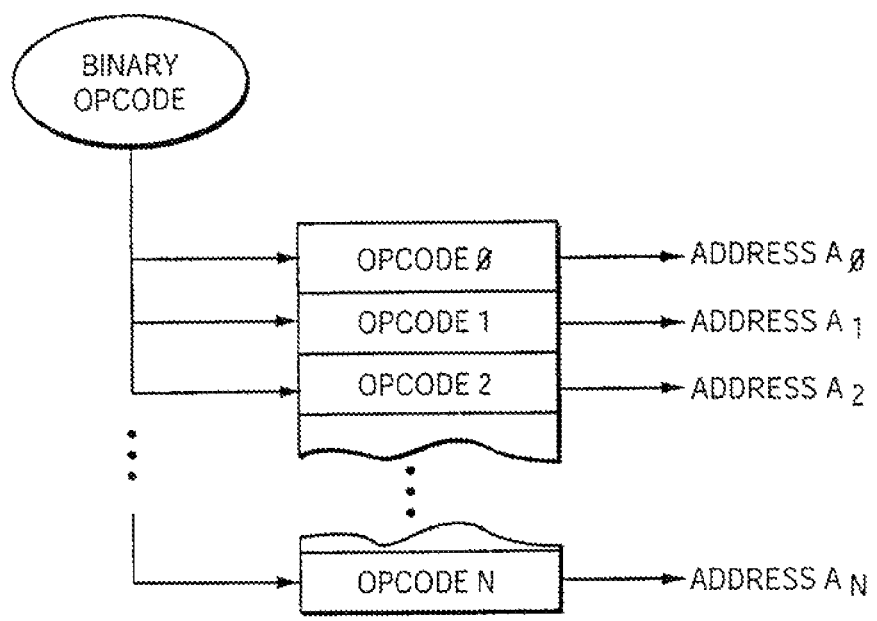
FIG. 11 shows an example op code jump table.

In the example embodiment, the virtual microprocessor core 102 interprets the binary instruction formats of game file 66 (FIG. 2A block 72). As mentioned above, the game file 66 binary instruction formats in the example embodiment are compiled for execution by a Z80 microprocessor of the native platform—whereas the target platform on which emulator 100 runs may be any microprocessor (e.g., an Intel 8086 family microprocessor). In the example embodiment, the virtual microprocessor core 102 may include a binary instruction format parser implemented as a jump table (e.g., C or C++ "case" statement) that parses the binary op code portion of the incoming instruction and jumps to appropriate code that performs one or a series of steps that will cause emulator 100 to emulate the operation of that instruction. FIG. 11 shows an example jump table flow based on the jump table 182 (which may be implemented as inline code if desired).

Figure 12:
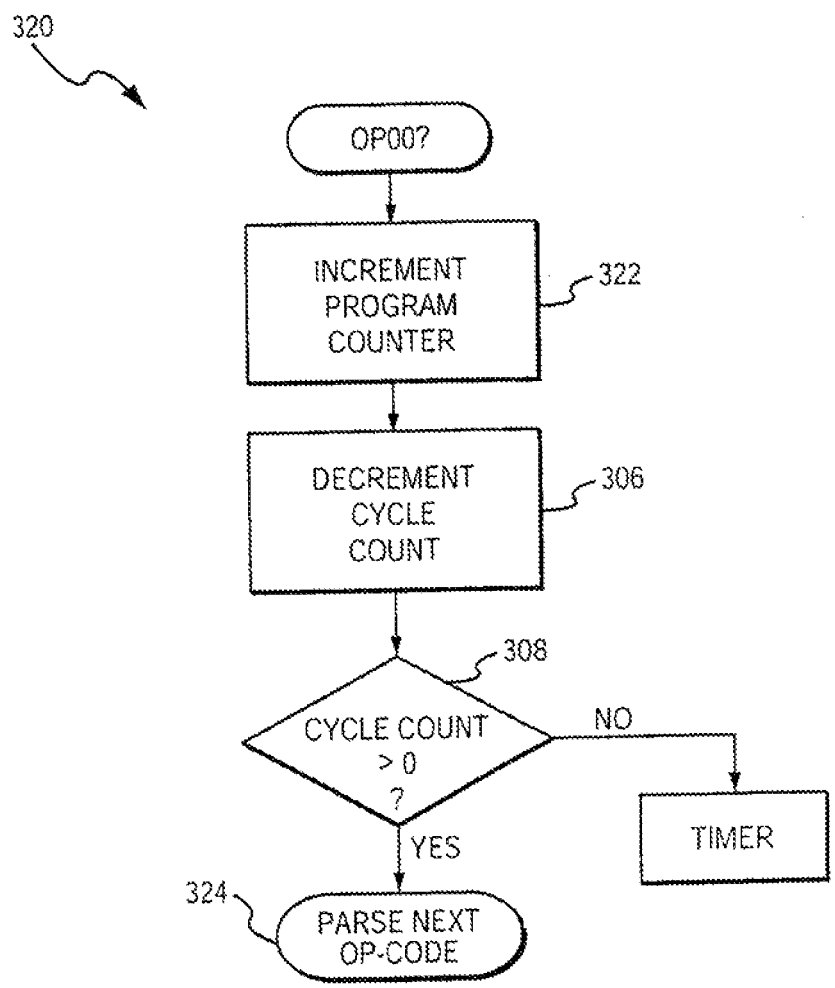
FIG. 12 shows example emulation of a particular (NOP) instruction.

Those skilled in the art will understand that different native instructions can be emulated in different ways depending upon the particular instruction. FIG. 12 shows an example flow diagram for emulation of an example "no operation" (NOP) instruction. In this FIG. 12 example, an op code of "00" parsed by the FIG. 11 process results in transferring control to the FIG. 12 process for emulating the "no operation" instruction. On the native platform, a "no operation" instruction results in nothing happening (wait) for a CPU cycle. Within emulator 100, in contrast, certain tasks are performed in response to such a "no operation" instruction. For example, an emulated program counter (which is different from the target platform program counter and is used to emulate the program counter of the native platform) is incremented (block 322), and the cycle counter is decremented (see block 306, FIG. 10). As shown in FIG. 10, if the cycle counter is not greater than zero, a "timer" function is called to perform the steps of blocks 310-316 shown in FIG. 10. If the cycle counter is still greater than zero, then control returns to the FIG. 11 operation to parse the next op code (block 324).

Some games and other applications make extensive use of "no operation" loops to maintain game timing. Somewhat surprisingly, such "no operation" loops can cause emulator 100 to run very slowly. To avoid this particular issue, it is possible for emulator 100 to include a dynamic code analyzer that "looks ahead" to the next few instructions surrounding a "no op" instruction to determine whether the game file 66 includes a "no op" loop. If emulator 100 determines that such a loop is present, then the emulator may intelligently use events other than a wait loop setting a timer and waiting for it to expire, or relying on the virtual liquid crystal display controller 103) as alternate means for providing the requisite "wait loop" timing. This optimization can result in increased efficiency by preventing the emulator 100 from becoming bogged down with "no operation" wait loops. In other embodiments, no NOP-reduction analysis is implemented, and the only such technique implemented is to detect whether a loop was waiting for a transition of the LCD machine and automatically force the transition. The problem is that such a technique may work for some games, but could cause some games to malfunction.

Example Memory Access Instruction Emulation

Figure 13:
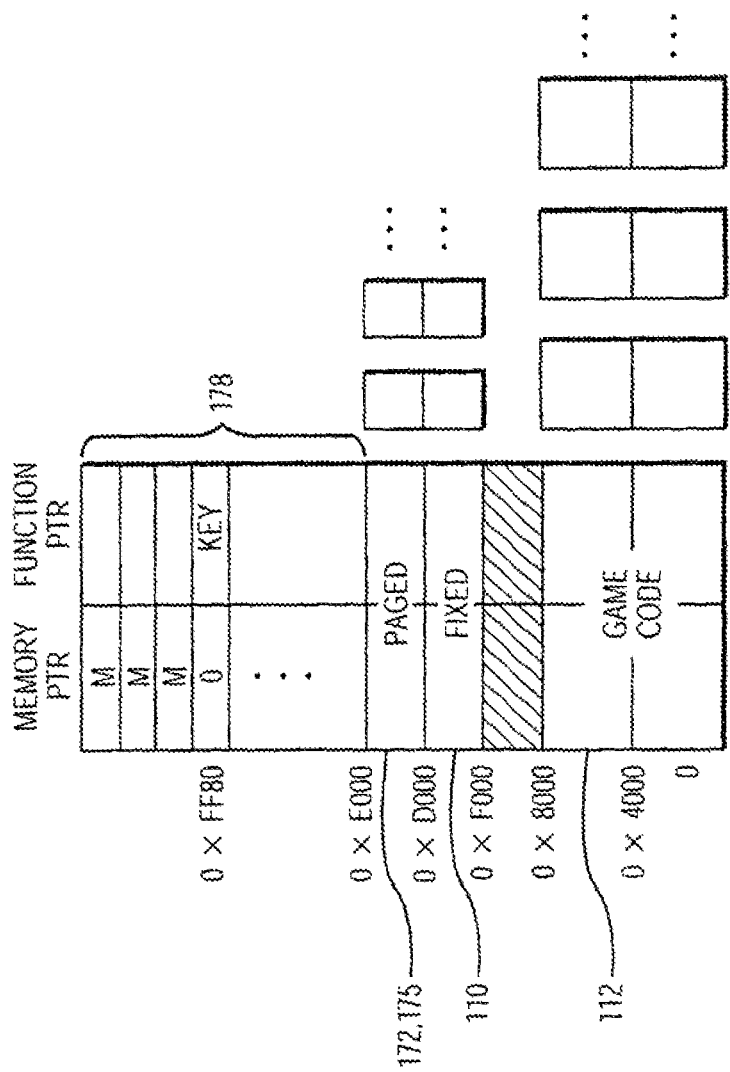
FIG. 13 shows an example page table.
Figure 14:
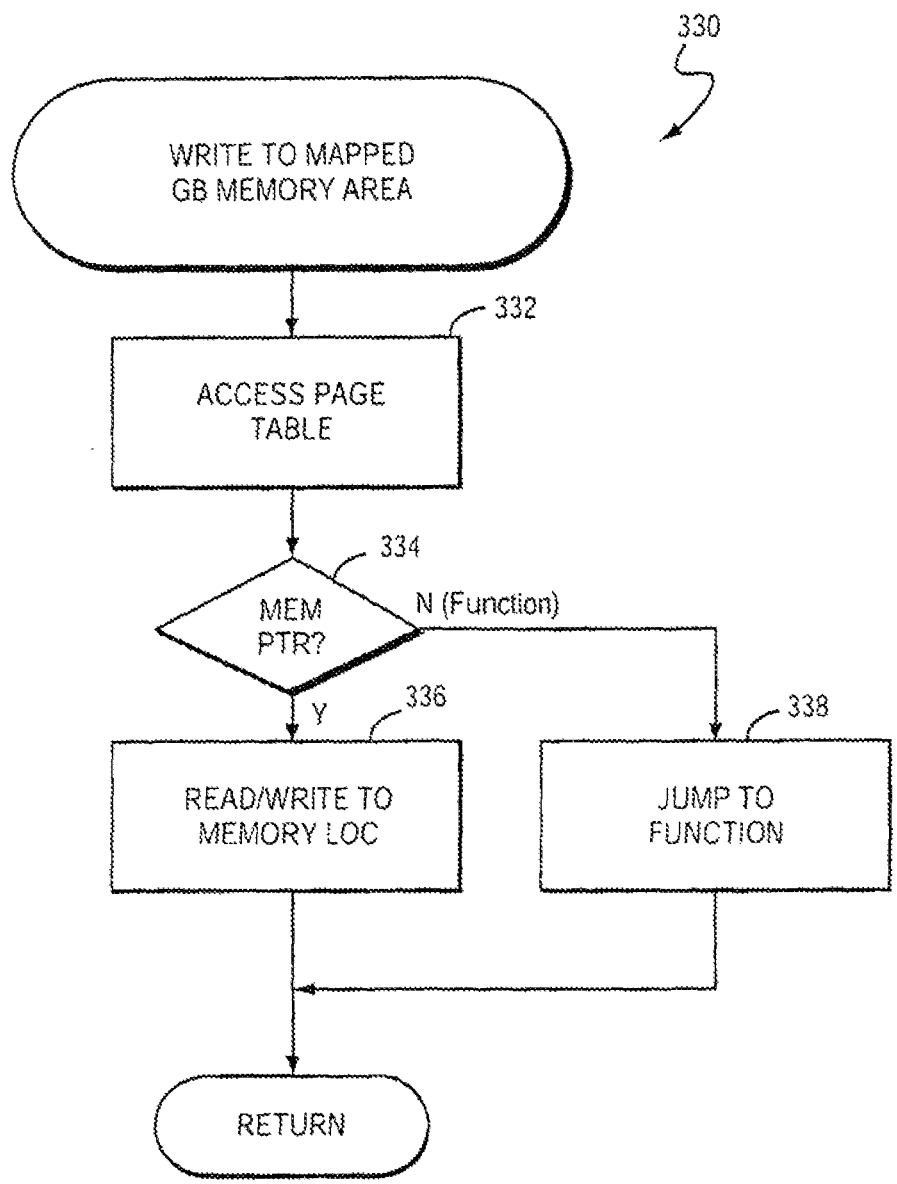
FIG. 14 shows an example memory access operation.

FIG. 13 shows an example page table 178 within the context of a memory map that also includes emulated RAM 110, 172, 175 and emulated ROM 112. This page table 178 is used in the example embodiment to process memory access commands within game file 66. In this example embodiment, some memory access (read or write) commands can be executed by performing the requested read or write operation on a specified location within memory. In such cases, page table 178 includes a memory pointer specifying a corresponding memory location—remapping various read/write locations into other locations as defined within the emulator 100 (see FIG. 14, blocks 332, 334, 336). In some cases, a read or write to a particular memory location will trigger the performance of a sequence of steps by emulator 100. As an example, a read by the game file 66 of a game controller input register of the native platform may cause emulator 100 to execute a "key" function in order to poll the keypad interface 54 and get a user controller input value. The preferred embodiment page table 178 handles this situation by providing a zero-valued memory pointer within page table 178 (FIG. 14, block 334) that causes the emulator to reference an associated "key" function pointer—resulting in the calling of a "key" function (FIG. 14, block 338). In this way, page table 178 efficiently maps native instruction memory accesses to the same or different memory locations within emulated memory and/or to calling a function that emulates a result which would occur on the native platform in response to such a memory access command.

Also as shown in FIG. 13 and alluded to above, the emulated random access memory 172, 175, 110 and the emulated read only memory 112 may include multiple copies of the same information within the target platform random access memory 68 in order to provide more efficient paging and corresponding reduction in processing time.

Figure 15:
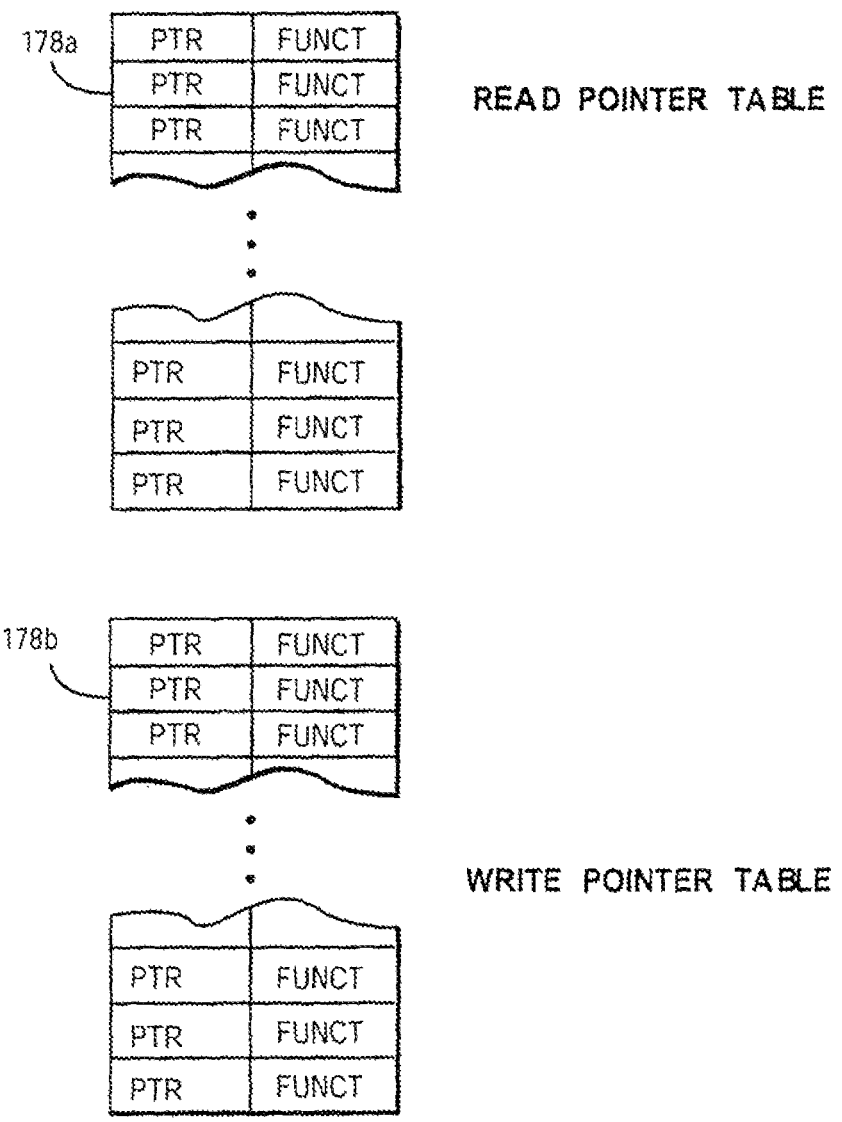
FIG. 15 shows example read and write pointer tables.

FIG. 15 shows implementation detail for one detailed implementation of page table 178. In this example, the page table may comprise two different tables 178a, 178b—one for read memory accesses and one for write memory accesses. Each of these tables may be 64 kilobytes (or other convenient size). All memory accesses by virtual microprocessor core 102 are performed via these tables 178a, 178b. The code that is reading or writing first looks to see if there is a non-null value in the "PTR" element for the desired address. The "PTR" element is a pointer to the pointer that defines the base of the target platform memory array that applies for the desired address. If there is a non-null "PTR" value, de-referencing "PTR" and adding the desired address will get emulator 100 to the target platform address to read/write. If, on the other hand, the "PTR" value is null, that means that there is a handler function defined for reading/writing to the desired address. The handler function can be called via the "FUNCT" element of the appropriate table.

Different functions can be called for reading from and writing to the same address in this example arrangement, and different pointers may be used reading from and writing to the same address. Similarly, a read operation with respect to a particular native address may cause a read from an active "PTR" memory mapped value whereas a write operation to the same address can invoke a handler function—or vice versa. The flexibility provided by this arrangement simplifies the architecture of emulator 100 while providing an efficient way to execute instructions from game file 66.

Emulated Microprocessor Registers

Figure 16:
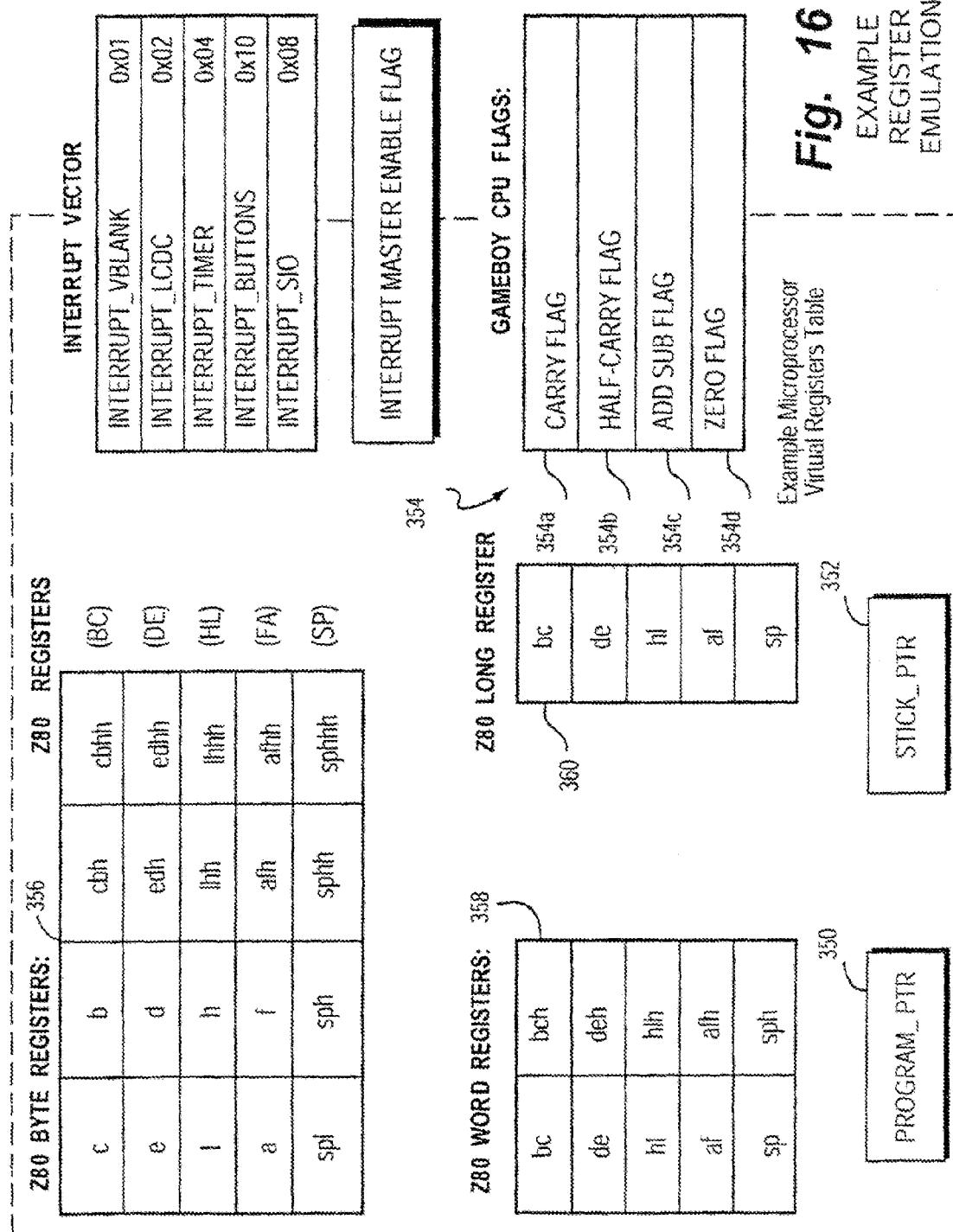
FIG. 16 shows example virtual microprocessor registers.

FIG. 16 shows example emulated registers within the virtual microprocessor core 102. In this example, the native (e.g., Z80) microprocessor registers are emulated with random access memory values within the target platform RAM 68 and/or actual registers internal to the target platform CPU. For example, it may be desirable to map certain emulated native microprocessor registers to target microprocessor registers for efficiency purposes (e.g., to map a program counter 350 to a general purpose register within the target platform CPU).

In the example embodiment, the program counter or program pointer 350 may include a current base pointer for the program counter as well as an offset portion. Similarly, a stack pointer 352 may include a base pointer for an emulated stack pointer to which may be added an offset (e.g., in a target platform register). Virtual microprocessor core 102 may further include a set of emulated native platform flags 354 including:

a carry flag 354a,
a half-carry flag 354b,
an add sub flag 354c,
a zero flag 354d.

In the example embodiment, emulated flags 354 are not in the same bit positions as the native platform flags, but rather they are in positions used by the target platform processor. This allows emulator 100 to pass "virtual" flags to the target platform processor before performing operations that effect the flags. The target platform flags are retrieved into the virtual flag data structure 354 after the operation is performed.

In the example embodiment, the various native platform general purpose registers are defined in three separate data structures as bytes (block 356), words (block 358) and long words (block 360). The three structures 356, 358, 360 are bundled into a union so that emulator 100 can access a particular register as a byte, a word or a long word as needed. In the example embodiment, the program pointer 350 is not included because it is maintained as a C character pointer for maximum efficiency. The program counter or pointer can be declared as a local variable in the main emulation function 122, and the compiler preferably implements the program pointer 350 as a register in the target platform CPU as described above.

Figure 17:
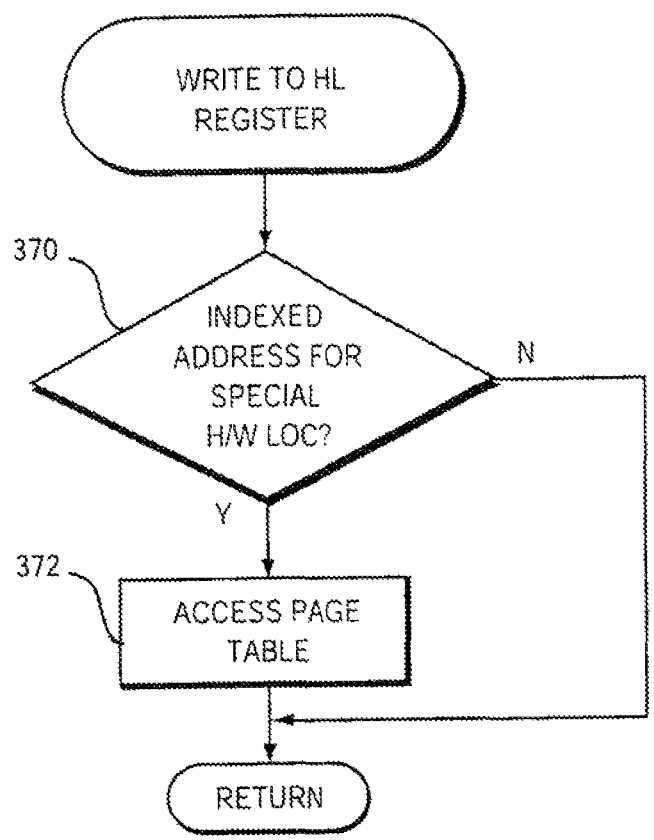
FIG. 17 shows an example HL register write optimization.

Some additional optimizations are possible when accessing the emulated registers shown in FIG. 16. For example, the HL register within the native platform CPU is often used as an index register. As FIG. 17 shows, it is possible for virtual microprocessor core 102 to "look ahead" by determining whether the indexed address is for a special hardware location in response to a write to the FIL register (decision block 370)—and to access page table 178 immediately in response to such an indexed address so that the corresponding memory pointer and/or function are available when a further instruction comes along that uses the HL register contents for an indexed operation (block 372). This optimization can save processing time. Indirect accesses via HL or any other 16-bit register (BC or DE) are all handled by referring to the I/O read/write handler tables in the example embodiment. One "look-ahead" technique the preferred embodiment emulator uses is the "prefetch queue" implemented by always fetching four bytes into a 32-bit target platform register each time. The low-order byte is the opcode the emulator is after, but many opcodes require one or two subsequent bytes as data or extended opcode. By having four bytes in a register, any opcode handlers that need subsequent bytes already have them in a CPU register.

Referring once again to FIG. 16, the virtual microprocessor core 102 further includes a set of interrupt vectors and an interrupt master enable flag that are used to emulate the interrupt structure within a GAME BOY®, GAME BOY COLOR and/or GAME BOY ADVANCE® native platform. This interrupt vector (when enabled by the interrupt master enable flag) can be read to determine what portion of emulator 100 caused a particular interrupt (e.g., vblank, the liquid crystal display controller, a timer, button depression, or serial input/output). Emulator 100 provides an emulated interrupt controller that emulates the actual native platform interrupt structure in controller to maintain compatibility and event-driven functionality of game file 66.

Example Keypad Emulation

Figure 18:
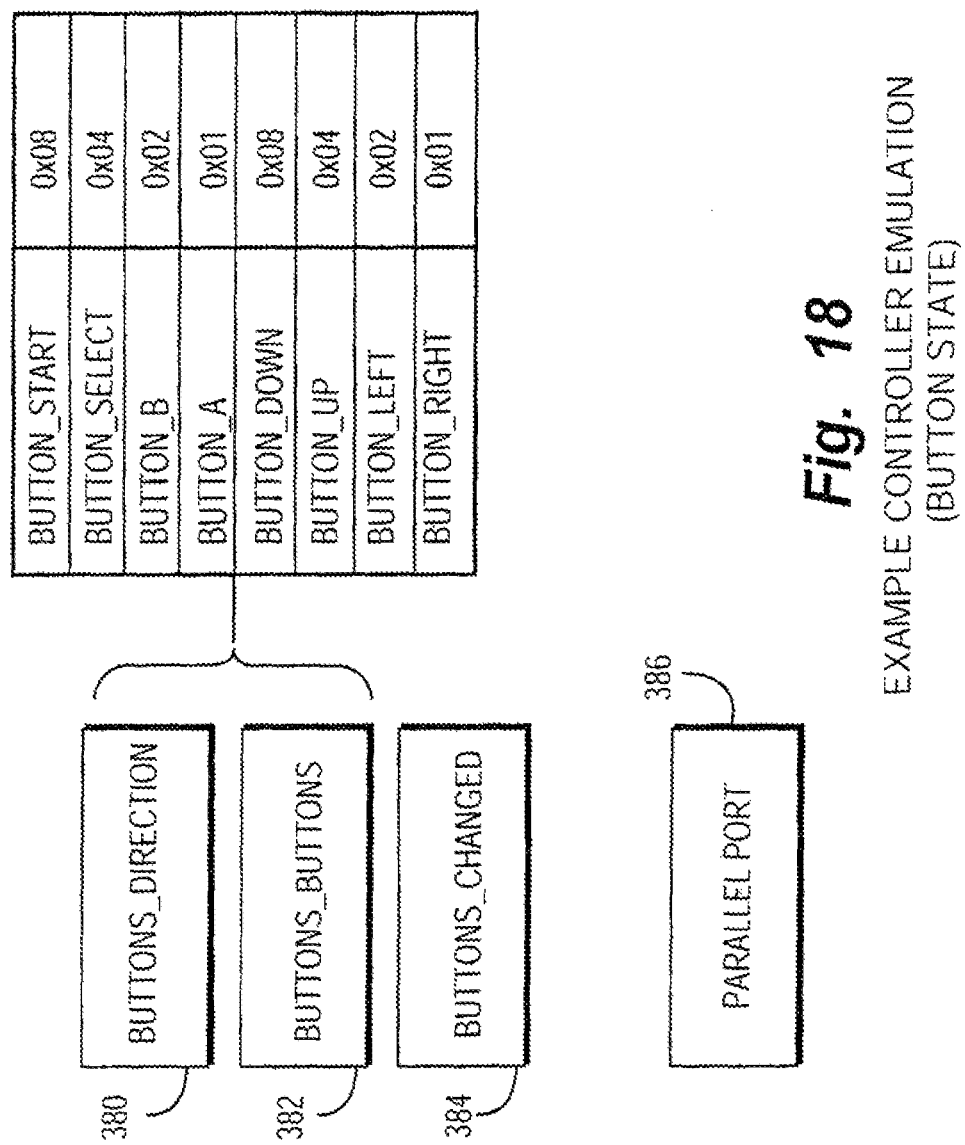
FIG. 18 shows an example input controller emulation register set.

As shown in FIG. 18, preferred embodiment emulator 100 provides keypad emulation 104 in the example embodiment through the use of certain data registers/flags including:

a buttons direction register 380 that maintains the data for emulated direction keys,
a buttons buttons register 382 that maintains the data for the emulated control buttons, and
a buttons changed flag 384 that indicates that the button data has been changed.

In one example embodiment, the buttons direction register 380 and the buttons buttons register 382 encode various button parameters in certain bit positions as shown in FIG. 18. As mentioned above, the buttons functional module 136 shown in FIG. 3 may be used to retrieve inputs from keypad interface 54 and load them into the FIG. 18 data structures for reading by virtual microprocessor core 102. These data structures and associated functionality emulate the hardware control input controller of the native platform by duplicating the register interface of the native platform in software. Target platform controller device 56 may be any of a variety of different configurations including, for example, an SNES handheld controller, a keypad, or any other input device capable of interacting with a user. A "parallel port" register or indicator 388 may be used to define the type of keypad interface 54 (e.g., SNES controller adapter or keyboard) that will be used for the controller input on the target platform.

Miscellaneous Additional Virtual Microprocessor Data Structures/Functions

Figure 19A:
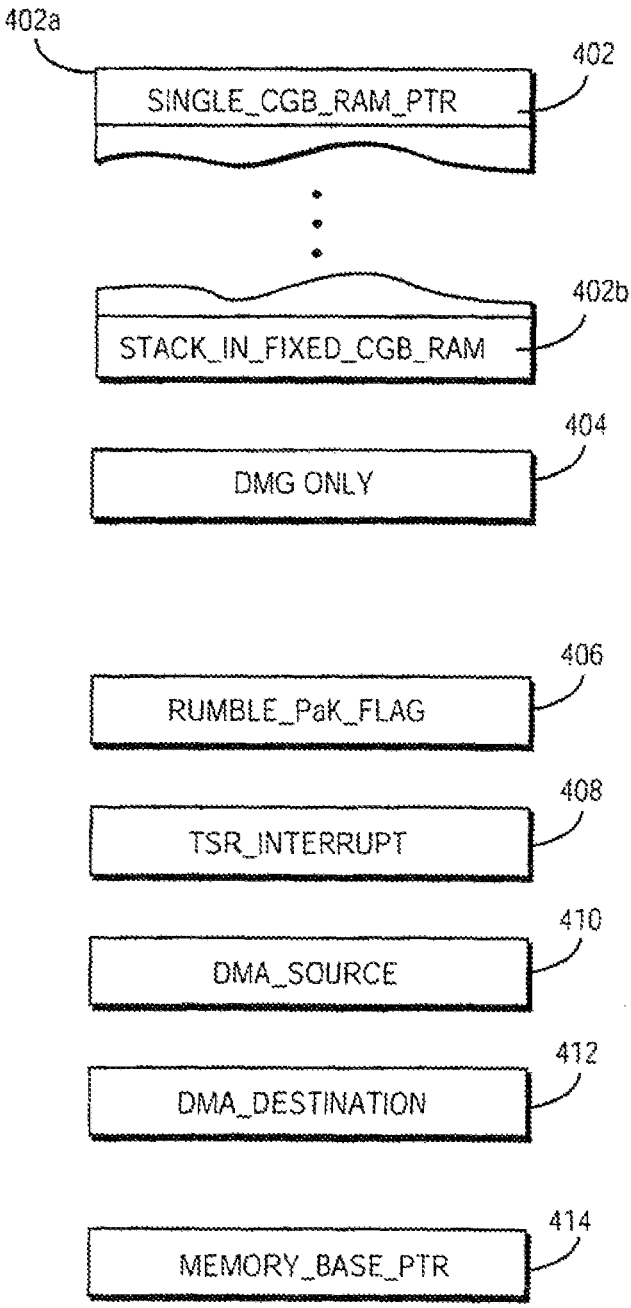

FIGS. 19A and 19B show example additional virtual microprocessor data structures. These data structures are used to provide a variety of different additional functionality in the example embodiment of emulator 100.

As shown in FIG. 19A, preferred embodiment emulator 100 may include one or more game-specific emulation options that go into effect for particular games or other applications (FIG. 2A block 71). As one example, an "options" data structure 402 may specify particular functions and/or features that could be activated selectively depending upon the particular application or game being supplied by game file 66. Such game-specific emulation options can improve efficiency by tailoring the operation of emulator 100 for particular applications or games on a dynamic, as-needed basis. While in some embodiments it would be best to avoid using game-specific options, in other examples it might be desirable to use such game-specific options to increase efficiency and/or functionality.

As shown in FIG. 19A, one game-specific option might be using a single CGB_RAM memory pointer. Another game-specific option is the 30/45 fps frame rate option described previously. Other game-specific options are possible.

FIG. 19A also shows a "DMG only" flag 404 that is used in the example embodiment to indicate that the loaded game file 66 is COLOR GAME BOY® incompatible. This DMG only flag 404 (which is set or unset depending on the compatibility modes shown in FIG. 6) is used to determine whether COLOR GAME BOY® functionality of emulator 100 is enabled or disabled. It is also possible to provide a flag indicating that the stack pointer is allocated to a particular region of memory (e.g., fixed emulated COLOR GAME BOY® RAM). The flag that indicates that the stack pointer is pointing to a particular region of memory (fixed CGB RAM) is not a game-specific option in one example embodiment, and is set dynamically by the emulator 100.

A rumble pack flag 406 is used in the example embodiment to indicate whether the loaded game file 66 supports the rumble pack feature of certain native platform games.

The TSR interrupt register 408 in the example embodiment specifies the number of the DOS interrupt used for host-to-emulator communication.

A DMA source register 410 specifies a source address for emulated direct memory access operations, and a DMA destination register 412 specifies a destination address for emulated direct memory access operations. A memory base pointer 414 specifies a base pointer for non-paged memory 110.

Referring to FIG. 19B, a register file including for example, various native platform registers emulated in software (RAM locations) is shown. Such registers include, for example, sound control registers ("NR10-NR52), a liquid crystal display controller register having the bit assignments shown, and a status register STAT having the bit assignments shown.

In terms of sound emulation, certain information written to the sound control registers may be straight-forwardly translated and passed on to the target platform sound adapter 58 using the particular API used by that sound adapter. Other sound generation commands are peculiar to the GAME BOY®, GAME BOY COLOR® and GAME BOY ADVANCE® native platforms, and need to be emulated using sound-producing functions. These sound-producing functions take advantage, as much as possible, of the target platform sound generation capabilities, but typically need to provide additional state information (e.g., implementation of a sound-generation state machine) in order to ensure sound timing synchronization. Maintaining real time sound timing sound synchronization is especially important with voices—which will sound unnatural if played back too fast or too slow. Unfortunately, voice reproduction may be difficult to achieve since the strict CPU timing necessary to play back voice takes up too much time in itself, and may not be possible to perform on a low-resource target platform. Games that rely on voice playback for a satisfactory game play experience may have to be excluded. In the example embodiment, the sound module translates writes to the virtual sound registers to appropriate sound information for the target platform sound adapter. If the sound library used does not provide for automatic termination of sounds after specified durations, then the emulator 100 may also be provided with the capability to terminate sounds at appropriate times.

Graphics Emulation

As described above, a graphics emulation 108 portion of emulator 100 in the example embodiment receives commands from the virtual microprocessor core 102 and performs responsive graphics tasks. This graphics emulation functionality performed by block 108 supplies capabilities normally supplied by the graphics acceleration hardware of the native platform.

One way to provide such graphics emulation 108 would be to nearly exactly implement, in software, each of the hardware structures of the native platform's graphics circuitry. This is not necessarily the best approach, however, since it may be more efficient to perform certain graphics-related tasks differently in software. FIG. 20 shows an example of how the efficiency of preferred embodiment emulator 100 is enhanced by handling character data differently than the way it is handled in the native platform.

Figure 21:
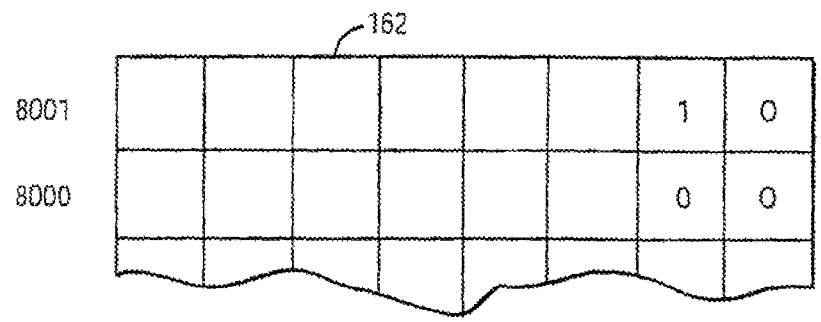
FIG. 21 shows an example native character data.
Figure 22:
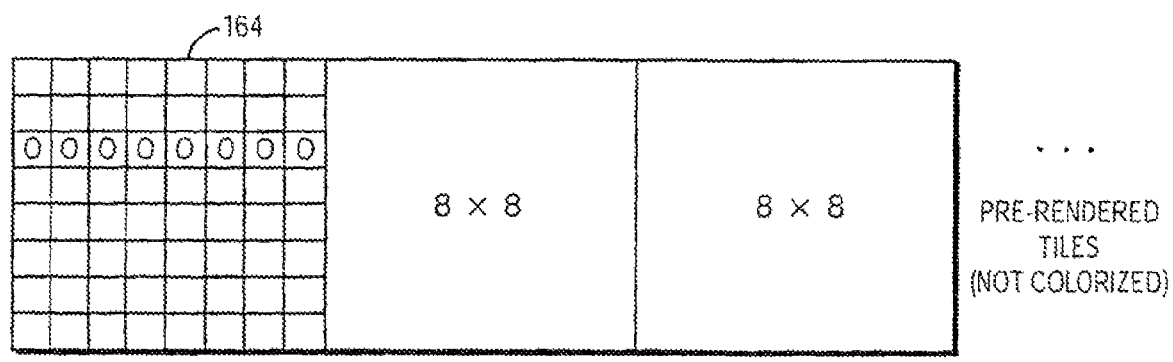
FIG. 22 shows example pre-rendered un-colorized "bit-map-ized" character tiles.

In the FIG. 20 example, a pre-computed translation table 163 is used to translate "raw" character data within an array 162 into a "bit mapped-ized" character data format for storage into buffer 164. FIGS. 21 and 22 further illustrate this feature. The FIG. 21 representation shows a portion of the "raw" character data buffer 162 storing the character data bit planes as they are typically maintained by the native platform. Pre-computed translator 163 translates this raw character data representation into a differently-ordered and organized, bit mapped character data representation more like the format found in a conventional bit map (.bmp) file. This character data reorganization is useful in minimizing processing time required to output character graphics data to the video adapter 62. The FIG. 22 "bit mapped-ized" representation is more compatible with VGA and other commonly-used video adapter hardware, and the pre-computation of translator 163 allows this data reorganization to occur in a straight forward manner in advance of the time when the graphics data is sent to the graphics adapter 62.

Figure 23:
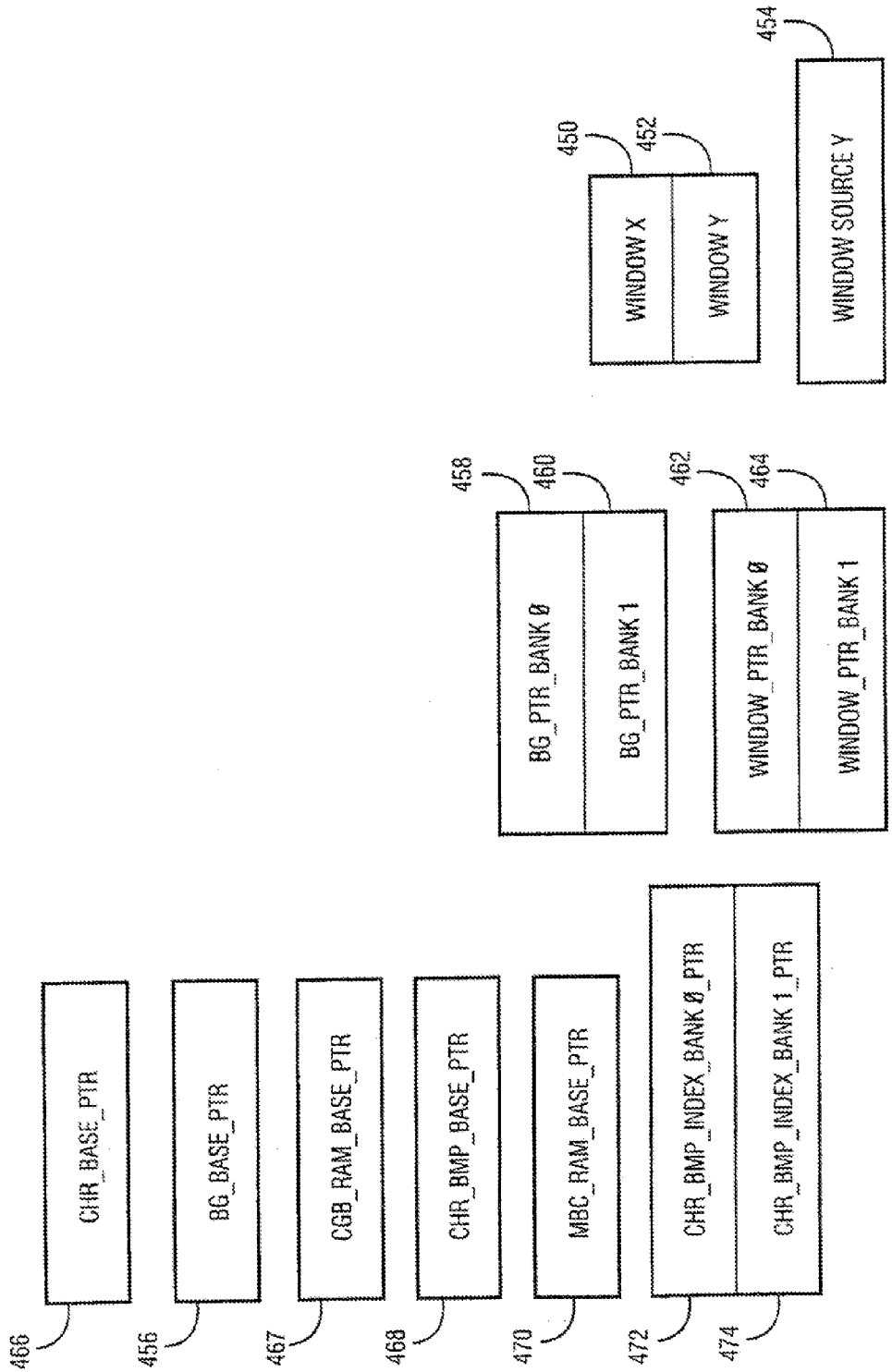
FIG. 23 shows example graphics object pointers.

FIG. 23 shows a number of example graphics object pointers used by graphics emulation block 108, including:

window x, window y registers 450, 452 specifying the coordinates of the display window (these coordinates may be copied from the memory [wx], memory [ly] values at the top of each frame), a window source y register 454 specifying the y coordinate for the source data for a window (this may start at zero at the top of the window), a background base pointer 456 that stores the base pointer for the current background RAM area (moves between background 1 and background 2, pages zero and one), a background pointer bank zero and background pointer bank one register 458, 460 specifying the base pointer for the current background RAM page zero and page one (these registers move between background 1 and background 2 areas), a window pointer bank zero register and a window pointer bank one register 462, 464 (these registers specify base pointers for the current window RAM page zero and one respectively (they move between pages zero and one)), a character base pointer register 466 specifying the base pointer for the current character RAM area (moves between pages zero and one), a character RAM base pointer 467 specifying the base pointer for the current internal COLOR GAME BOY® RAM area 175 (0xC000-0xE000), a character bit mapped base pointer 468 specifying the base pointer for the "bit map-ized" character data 164 (this pointer moves between pages zero and one), a memory bank controller RAM base pointer 470 specifying the base pointer for the current cartridge RAM page 172, a character bit map index bank zero pointer and a character bit map index bank one pointer 472, 474 used as pointers to pre-sort an (addressing mode appropriate) array of pointers to the bank zero (bank one) "bit map-ized" character data.

Figure 24:
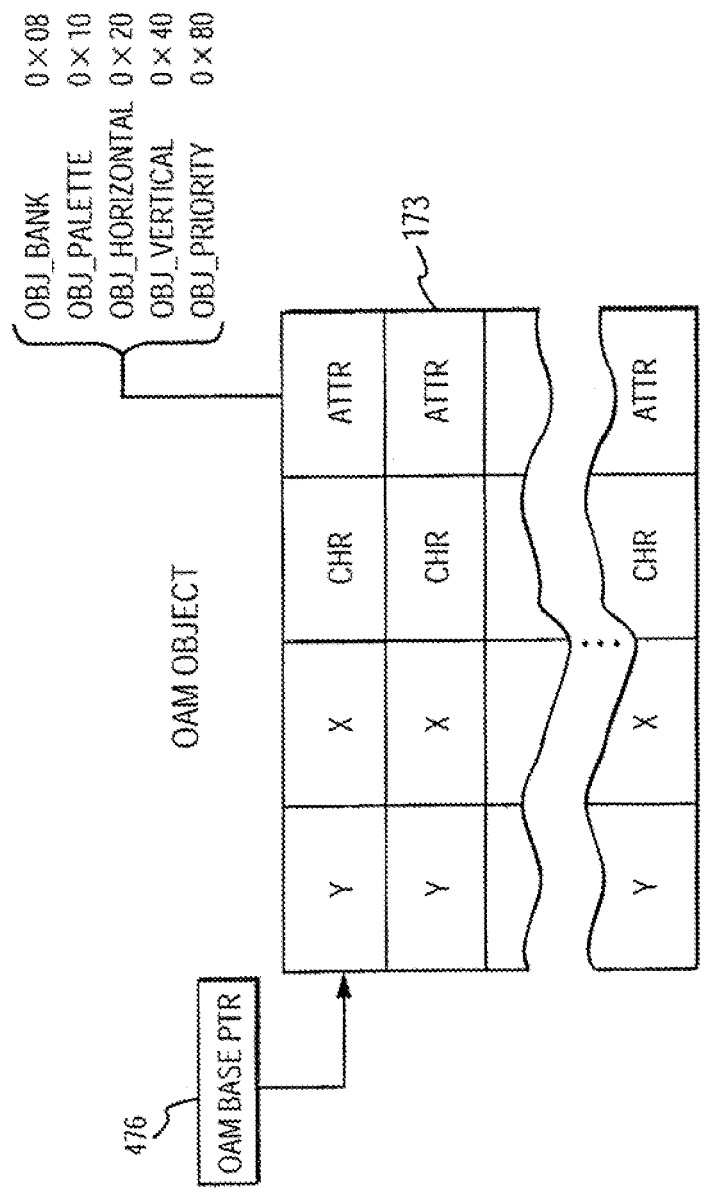
FIG. 24 shows example emulated object attribute memory.

FIG. 24 shows an example illustration of a preferred embodiment emulated object attribute memory 173. In this example, the native platform includes an object attribute memory that maintains pointer and other information relating to characters to be displayed on the next frame. Preferred example embodiment emulator 100 includes an emulated object attribute memory 173 including an array of up to 40 objects each including y (vertical position), x (horizontal position), character (identifier) and attribute field. The bit-encoding of the attribute field information is also shown in FIG. 24. An OAM base pointer 476 is used to function as a pre-allocated pointer to the emulated object attribute memory object 173.

Figure 25:
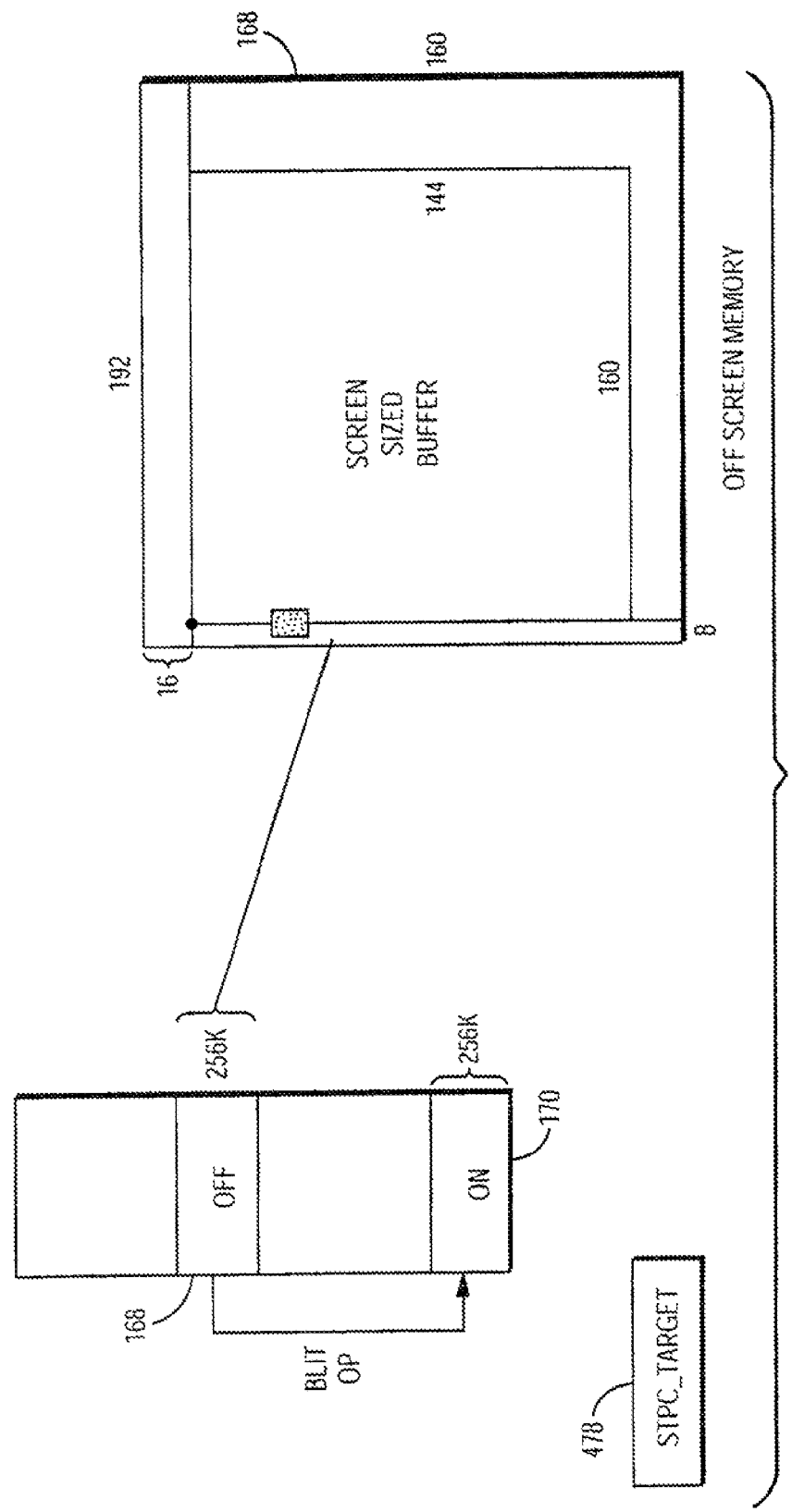
FIG. 25 shows an example video memory transfer process.

FIG. 25 shows an example video memory arrangement including an off screen memory buffer 168 and an on screen memory buffer 170. In the example embodiment, the off screen memory buffer 168 is defined to be larger than the display size of the native platform. For example, the display size of a GAME BOY® or COLOR GAME BOY® is 160 pixels by 144 pixels high. In the example embodiment, off screen memory buffer 168 is defined to be 192 pixels wide by 160 pixels high—leaving additional memory locations on all sides of the screen size buffer. A buffer zone of sixteen bytes or eight bytes is useful in improving efficiency. The use of screen memory buffers larger than screen size is an attempt to increase graphic drawing efficiency by eliminating clipping calculations and using the hardware BitBlt to transfer a subset of the memory buffer to displayed video memory. It may be desirable to use two off-screen buffers and one on-screen buffer in a classic "double-buffering" technique. Emulator 100 may draw to one buffer until it is complete, then switch to the other buffer. On the target hardware's vertical retrace interrupt, the emulator 100 copies the last-completed buffer to the on-screen area via BitBlt. This works well when a way is provided to implement the vertical retrace interrupt. As mentioned above, the "buffer zone" in the memory buffer is used to eliminate clipping calculations.

The example embodiment emulator 100 uses a hardware-assisted bit BLIT operation to copy the contents of the screen size buffer into on screen buffer 170. Such a bit-BLIT hardware-assisted operator can increase transfer times without corresponding increases in overhead. If a bit BLIT operation is not available, then a conventional direct memory access or other memory transfer can be used instead. In the example embodiment, a STPC_TARGET register 478 is used to specify whether a bit BLIT engine of the target platform is available and can be used (if one is not available, then a conventional memory copy function can be used instead).

Figure 26:
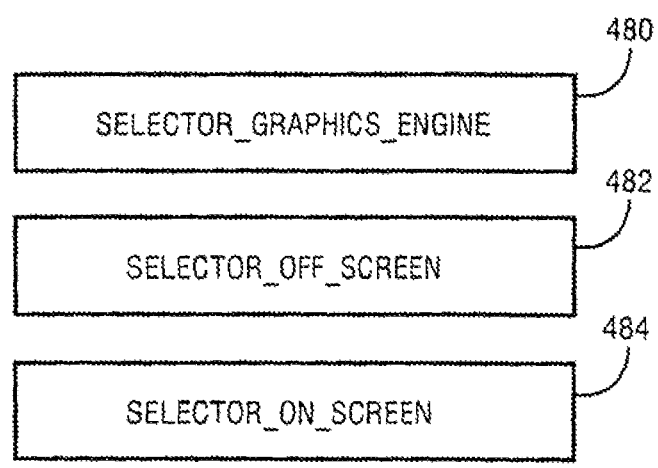
FIG. 26 shows example graphics mode selectors.

FIG. 26 shows some example additional graphics mode selectors used by emulator 100 in the preferred embodiment, including:

a selector graphics engine register 480 that selects protected-mode memory for the graphics engine registers, a selector off screen register 482 that selects protected mode memory for the off-screen video memory buffer 168 (two such selector registers can be used to indicate which one of two double buffered buffers is currently being drawn, with an index variable indicating this), and a selector on screen register 484 that selects protected mode memory for the on-screen video memory buffer 170.

Figure 27:
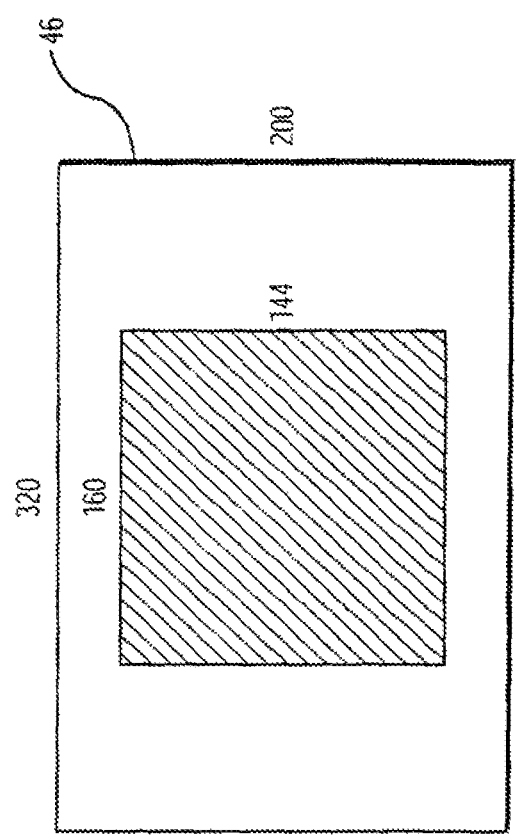
FIG. 27 shows example screen layouts.

FIG. 27 shows an example screen layout of display 64 showing that the emulated display provided by on-screen buffer 170 may be smaller than the actual display area of display 64. In one example embodiment, the graphics adapter 62 and associated display 64 may provide a resolution of 320 pixels by 200 pixels, whereas emulator 100 produces an emulated image of 160 pixels by 144 pixels. Emulator 100 uses only a subset of display 64 to display emulated images in order to preserve aspect ratio.

FIG. 28 shows an example set of graphics adapter 62 control constants that may be set to the VGA graphics adapter in order to set the graphics adapter's mode for use with emulator 100. Emulator 100 may be hard-coded to a particular graphics mode (320×200×16), an 8-bit color mode, or other mode available on the target hardware. If the 320×200×16 color mode (VESA mode 0x10E) works on a particular target platform, emulator 100 may use this mode exclusively—and there will be no need for different control constants for the VGA.

FIG. 29 shows example graphics engine register indices and associated example values. A screen pitch of 384 may also be defined as a constant in the example embodiment.

Example Color Palette Processing

En the example embodiment, the handling of color palettes can lead to efficiency problems. In the example native platforms, graphics characters are represented in a color lookup table (CLUT) format (i.e., the graphics characters themselves include a reduced number of bits that are used to look up a color value in a color palette for display). See FIG. 21. The example COLOR GAME BOY® native platform can display 56 colors on the screen nominally (eight palettes of four colors each for background, and eight palettes of four colors each for object characters minus transparency). It would seem therefore that with only 56 simultaneous colors on the screen at any one time, it would be possible to use a 320×200×8-bit VGA mode (13H) which would provide 256 different colors on the screen at once (much more than 56 colors). One possibility would be to simply add an offset into a VGA palette when using 8 bits of color. However, certain game developers for the COLOR GAME BOY® native platform change color palettes during horizontal blanking periods to achieve greater color variety on the screen. To emulate for these particular games, it is necessary to provide more than 256 colors on the screen at a time. A mode such as the VESA standard (320×216 bits) provides 65,000 different colors (RGB 565)—about twice as much as the 32,000 colors the GAME BOY COLOR is capable of displaying. Thus, this video adapter mode is adequate for even applications that change their color palettes in the middle of a frame—but using this mode doubles the amount of information that must be sent to the video memory per frame and costs processing time. Moreover, it also requires emulator 100 in the preferred embodiment to map color information (4 bits) into 32,000 colors. The 16-bit color resolution makes it desirable for emulator 100 to write 16-bit color palette information into the video adapter 62. This, in turn, necessitates a memory array of 16-bit numbers associated with the various color palettes. The color palettes (see FIG. 4) can be accessed on a character-by-character basis, using pointers to apply color information to the "bit mapized" character data 164 before the data is written to the display buffer 168.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

I claim:

1. A method of emulating a handheld video game platform, the method comprising:
   loading and executing an emulator program on a processor of a target platform, the target platform being different from the handheld video game platform;
   parsing and interpreting, with the processor of the target platform executing the emulator program, a binary image capable of being executed on the handheld video game platform; and
   generating an audio visual real time interactive presentation on the target platform in response to the interpreted binary image,
   wherein the emulator program includes a virtual liquid crystal display controller that models the handheld video game platform with a sequential state machine.

2. The method of claim 1, wherein in the step of generating the audio visual real time interactive presentation on the target platform in response to the interpreted binary image, audio and video presentations are generated to be synchronized with each other as they would be synchronized on the handheld video game platform.

3. The method of claim 1,
   wherein the virtual liquid crystal display controller models pacing of audio and video presentations of the handheld video game platform hardware through the sequential state machine, and
   wherein the method further comprises:
      tracking states of the sequential state machine; and
      synchronizing operations of the emulator program to the states of the sequential state machine.

4. The method of claim 1, wherein in the step of generating the audio visual real time interactive presentation on the target platform in response to the interpreted binary image, the audio visual real time interactive presentation is generated to be synchronized with states of the sequential state machine so as to maintain a game timing on the target platform as the game timing would be maintained on the handheld video game platform.

5. A system that emulates in software, at least a portion of handheld video game platform hardware, the system comprising:
   a target platform different from the handheld video game platform, the target platform including a processor that loads and executes an emulation software, parses and interprets a binary image capable of being executed on the handheld video game platform, and generates an audio-visual real time interactive presentation in response to the interpreted binary image,
   wherein the target platform under control of the emulation software includes a virtual liquid crystal display controller that models the handheld video game platform with a sequential state machine.

6. The system of claim 5, wherein the target platform generates, using the emulation software, audio and video presentations to be synchronized with each other as they would be synchronized on the handheld video game platform hardware.

7. The system of claim 5,
   wherein the virtual liquid crystal display controller models pacing of audio and video presentations of the handheld video game platform hardware through the sequential state machine, and
   wherein the target platform tracks, using the emulation software, states of the sequential state machine, and synchronizes its operations to the states of the sequential state machine.

8. The system of claim 5, wherein the target platform generates, using the emulation software, the audio visual real time interactive presentation to be synchronized to states of the sequential state machine so as to maintain a game timing on the target platform as the game timing would be maintained on the handheld video game platform.

9. A method of emulating a video game platform, the method comprising:
   loading and executing an emulator program on a processor of a target platform, the target platform being different from the video game platform;
   parsing and interpreting, with the processor of the target platform executing the emulator program, a binary image capable of being executed on the video game platform;
   generating audio and video presentation on the target platform in response to the interpreted binary image, the audio and video presentation being generated to be synchronized with each other as they would be synchronized on the video game platform,
   modeling states and pacing of the video game platform using a sequential state machine; and
   synchronizing operations of the emulator program to the states of the sequential state machine.

10. The method of claim 9, wherein in the step of synchronizing the operations of the emulator program to the states of the sequential state machine, the operations of the emulator program are synchronized to the states of the sequential state machine so as to maintain a game timing on the target platform as the game timing would be maintained on the handheld video game platform.

11. A system that emulates in software, at least a portion of a video game platform, the system comprising:
   a target platform different from the video game platform, the target platform including a processor that loads and executes an emulation software, parses and interprets a binary image capable of being executed on the video game platform using the emulation software, and generates audio and video presentation in response to the interpreted binary image using the emulation software, wherein the target platform generates, using the emulation software, the audio and video presentation to be synchronized with each other as they would be synchronized on the video game platform, and wherein the target platform models states and pacing of the video game platform using a sequential state machine, and synchronizes operations of the emulation software to the states of the sequential state machine.

12. The system of claim 11, wherein the target platform synchronizes the operations of the emulation software to the states of the sequential state machine so as to maintain a game timing on the target platform as the game timing would be maintained on the handheld video game platform.

13. A method of emulating a video game platform, the method comprising:

loading and executing an emulator program on a processor of a target platform, the target platform being different from the video game platform;

parsing and interpreting, with the processor of the target platform executing the emulator program, a binary image capable of being executed on the video game platform; and generating audio and video presentation on the target platform in response to the interpreted binary image, the audio and video presentation being generated to be synchronized with each other as they would be synchronized on the video game platform, wherein the emulator program includes a sequential state machine that models states related to drawing of frames on a display of the video game platform, and wherein in the step of generating the audio and visual presentation on the target platform in response to the interpreted binary image, the presentation is generated to be synchronized with the states of the sequential state machine so as to maintain a game timing on the target platform as the game timing would be maintained on the handheld video game platform.

14. A system that emulates in software, at least a portion of a video game platform, the system comprising:

a target platform different from the video game platform, the target platform including a processor that loads and executes an emulation software, parses and interprets a binary image capable of being executed on the video game platform using the emulation software, and generates audio and video presentation in response to the interpreted binary image using the emulation software, wherein the target platform generates, using the emulation software, the audio and video presentation to be synchronized with each other as they would be synchronized on the video game platform, wherein the emulation software includes a sequential state machine that models states related to drawing of frames on a display of the video game platform, and wherein the target platform generates, using the emulation software, the audio and video presentation to be synchronized to the states of the sequential state machine so as to maintain a game timing on the target platform as the game timing would be maintained on the handheld video game platform.

* * * * *